US012784517B2

(12) United States Patent
Sekiya et al.

(10) Patent No.: US 12,784,517 B2
(45) Date of Patent: Nov. 3, 2026

(54) VEHICULAR POSITION ESTIMATION SYSTEM

(71) Applicant: DENSO CORPORATION, Kariya-city (JP)

(72) Inventors: Youhei Sekiya, Nisshin-city (JP); Kenichiro Sanji, Nisshin-city (JP); Kazuhiro Nakashima, Kariya-city (JP); Takashi Shinoda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 525 days.

(21) Appl. No.: 17/387,443

(22) Filed: Jul. 28, 2021

(65) Prior Publication Data

US 2021/0358236 A1 Nov. 18, 2021

Related U.S. Application Data

(63) Continuation of application No. PCT/JP2020/000224, filed on Jan. 8, 2020.

(30) Foreign Application Priority Data

Jan. 31, 2019 (JP) ................................ 2019-015242

(51) Int. Cl.

| | |
|---|---|
| ***H04W 4/48*** | (2018.01) |
| ***G07C 5/00*** | (2006.01) |
| ***G07C 5/08*** | (2006.01) |

(52) U.S. Cl.

CPC .......... *G07C 5/0816* (2013.01); *G07C 5/008* (2013.01); *H04W 4/48* (2018.02)

(58) Field of Classification Search

CPC ..... H04W 4/48; H04B 17/318; G07C 5/0816; G07C 5/008; G01S 5/0284;

(Continued)

(56) References Cited

U.S. PATENT DOCUMENTS 9,799,017 B1 * 10/2017 Vermeulen ............ G06F 16/285
10,410,450 B1 * 9/2019 DeLong .............. B60C 23/0413

(Continued)

FOREIGN PATENT DOCUMENTS

CN 104793180 A 7/2015
CN 106536840 A 3/2017

(Continued)

*Primary Examiner* — Fadey S. Jabr
*Assistant Examiner* — Michael J Herrera
(74) *Attorney, Agent, or Firm* — Harness, Dickey & Pierce, P.L.C.

(57) ABSTRACT

A vehicular position estimation system estimates a portable terminal position with respect to a vehicle. Each of three or more in-vehicle communication devices is attached at a different position of the vehicle. Each of the multiple in-vehicle communication devices generates distance information indicating a distance from the in-vehicle communication device to the portable terminal. The vehicular position estimation system includes a position coordinate calculation portion that calculates a position coordinate of the portable terminal, and an area inside-outside determination portion that determines whether the portable terminal is inside the system actuation area.

13 Claims, 8 Drawing Sheets

(58) Field of Classification Search
CPC .. G01S 2205/01; G01S 13/931; G01S 13/765; B60R 25/31; B60R 25/245
See application file for complete search history.

(56) References Cited

U.S. PATENT DOCUMENTS

| | | | | |
|---|---|---|---|---|
| 10,555,133 | B1* | 2/2020 | Cohen | H04W 4/026 |
| 11,391,810 | B2* | 7/2022 | Cuddihy | G01S 5/0226 |
| 2001/0053699 | A1* | 12/2001 | McCrady | H04W 64/00 455/513 |
| 2003/0053811 | A1* | 3/2003 | Takayama | G03G 15/2003 399/33 |
| 2003/0224777 | A1* | 12/2003 | Sakuma | H04W 24/00 455/423 |
| 2010/0191392 | A1* | 7/2010 | Juzswik | B60R 25/245 701/2 |
| 2012/0176272 | A1 | 7/2012 | Hirata et al. | |
| 2013/0143594 | A1* | 6/2013 | Ghabra | H04W 24/00 455/456.1 |
| 2014/0141800 | A1* | 5/2014 | Eum | H04W 4/043 455/456.1 |
| 2015/0208207 | A1 | 7/2015 | Ye et al. | |
| 2015/0326062 | A1* | 11/2015 | Gonzalez Valdez | H04B 5/0037 320/108 |
| 2015/0360564 | A1* | 12/2015 | Kalbus | B60K 35/00 701/36 |
| 2016/0182548 | A1 | 6/2016 | Ghabra et al. | |
| 2017/0019525 | A1* | 1/2017 | Hannon | G01S 1/752 |
| 2017/0085362 | A1* | 3/2017 | Alpert | H04L 7/0041 |
| 2017/0136992 | A1* | 5/2017 | Hamada | G01S 5/0278 |
| 2017/0142556 | A1* | 5/2017 | Matus | G10L 25/48 |
| 2018/0059209 | A1 | 3/2018 | Cuddihy et al. | |
| 2018/0290627 | A1* | 10/2018 | Hariri | B60R 25/245 |
| 2018/0292506 | A1* | 10/2018 | Bjorkengren | H04W 4/029 |
| 2018/0316788 | A1* | 11/2018 | Elliott | H04W 4/02 |
| 2019/0053021 | A1* | 2/2019 | Fuke | E05B 83/36 |
| 2019/0137595 | A1* | 5/2019 | Choi | H04W 64/00 |
| 2019/0258238 | A1* | 8/2019 | Lavoie | G05D 1/0022 |
| 2019/0308612 | A1* | 10/2019 | Lavoie | B60R 25/34 |
| 2020/0005566 | A1* | 1/2020 | Jain | G07C 9/28 |
| 2020/0169832 | A1* | 5/2020 | Kwon | H04W 4/80 |
| 2020/0305116 | A1* | 9/2020 | Berggren | H04W 64/00 |
| 2020/0374122 | A1* | 11/2020 | Naiki | G08B 21/00 |
| 2022/0326339 | A1 | 10/2022 | Cuddihy et al. | |
| 2024/0027568 | A1 | 1/2024 | Cuddihy et al. | |

FOREIGN PATENT DOCUMENTS

| | | | |
|---|---|---|---|
| CN | 108473109 | A | 8/2018 |
| CN | 108693502 | A | 10/2018 |
| DE | 102012222083 | A1 | 6/2013 |
| DE | 102017119718 | A1 | 3/2018 |
| JP | 2011080946 | A | 4/2011 |

* cited by examiner

VEHICULAR POSITION ESTIMATION SYSTEM

CROSS REFERENCE TO RELATED APPLICATIONS

The present application is a continuation application of International Patent Application No. PCT/JP2020/000224 filed on Jan. 8, 2020, which designated the U.S. and claims the benefit of priority from Japanese Patent Application No. 2019-015242 filed on Jan. 31, 2019. The entire disclosures of all of the above applications are incorporated herein by reference.

TECHNICAL FIELD

The present disclosure relates to a technology that estimates a relative position with respect to a vehicle of a communication device (hereinafter, portable terminal) carried by a user with use of electric waves.

BACKGROUND

A method, in which at least three reference stations of which positions are known communicate with a portable terminal such as a smartphone to specify a distance between each reference station and the portable terminal and a position of the portable terminal is estimated based on the distance information from each reference station, has been proposed as a comparative example. As a method for specifying a distance from the reference station to the portable terminal, a method using an electric wave propagation time (in other words, flight time), a method using a received signal strength (RSS), and the like have been proposed. Further, positioning methods using the electric wave propagation time include a TOA (Time Of Arrival) method, a TDOA (Time Difference Of Arrival) method, and the like.

SUMMARY

A vehicular position estimation system estimates a portable terminal position with respect to a vehicle. Each of three or more in-vehicle communication devices is attached at a different position of the vehicle. Each of the multiple in-vehicle communication devices generates distance information indicating a distance from the in-vehicle communication device to the portable terminal. The vehicular position estimation system includes a position coordinate calculation portion that calculates a position coordinate of the portable terminal, and an area inside-outside determination portion that determines whether the portable terminal is inside the system actuation area.

BRIEF DESCRIPTION OF DRAWINGS

The above and other features, and advantages of the present disclosure will be more clearly understood from the following detailed description with reference to the accompanying drawings. In the accompanying drawings.

DETAILED DESCRIPTION

Figure 1:
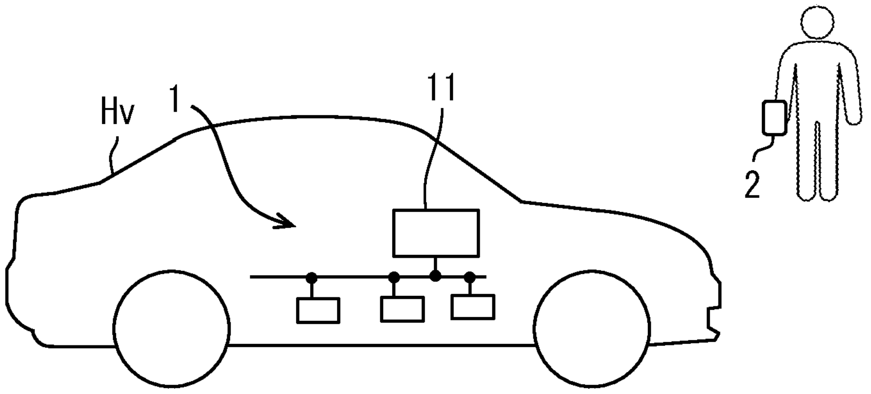
FIG. 1 is a diagram showing an overall configuration of a vehicular electronic key system.

According to the configuration in which each of the three or more communication devices (hereinafter, in-vehicle communication devices) is installed, as the above-described reference station, on a different position on the vehicle, it is possible to estimate a relative position (hereinafter, terminal position) of the portable terminal with respect to the vehicle by generating distance information from each in-vehicle communication device to the portable terminal. However, the above-described method is based on the premise that three or more in-vehicle communication devices can communicate with the portable terminal. Therefore, when the number of in-vehicle communication device that can communicate with the portable terminal is less than three, there is a possibility that the terminal position cannot be specified.

For example, when one or more in-vehicle communication devices broke down and the number of in-vehicle communication device that can normally operate is less than three, the terminal position cannot be specified. Further, even where three or more in-vehicle communication devices are normal, there may be a situation where the number of in-vehicle communication devices that can communicate with the portable terminal is less than three, depending on the portable terminal position. For example, when the portable terminal is located so as not to get an unobstructed view of some of in-vehicle communication devices, a situation where some of the in-vehicle communication devices cannot communicate with the portable terminal may occur. Even in such a case, the terminal position cannot be specified.

In such a case, by increasing the number of in-vehicle communication devices, it is possible to reduce a possibility that the terminal position becomes unknown. However, the increase in the number of in-vehicle communication devices causes the increase in the cost. In addition, since a mounting space of the vehicle is limited, there is an upper limit to the number of in-vehicle communication devices that can be installed. For example, depending on a model of the vehicle, it is conceivable that only three in-vehicle communication devices are installed.

One example of the present disclosure provides a vehicular position estimation system capable of reducing a possibility that a portable terminal position becomes unknown while preventing the cost from increasing.

According to one example embodiment, a vehicular position estimation system estimates a portable terminal position with respect to a vehicle by causing multiple in-vehicle communication devices placed at predetermined positions on the vehicle to wirelessly communicate with a potable terminal carried by a user of the vehicle. In the vehicular position estimation system, each of three or more in-vehicle communication devices is attached at a different position on the vehicle. Each of the multiple in-vehicle communication devices generate distance information directly or indirectly indicating a distance from each of the multiple in-vehicle communication devices to the portable terminal by receiving a signal from the portable terminal. The vehicular position estimation system includes: a position coordinate calculation portion that calculates a position coordinate of the portable terminal by combining the distance information generated by the three or more in-vehicle communication devices and an installation position of each of the in-vehicle communication devices that has generated the distance information; and an area inside-outside determination portion that determines whether the portable terminal is present in a system actuation area that is a region within a predetermined system actuation distance from an area formation station, based on a communication status between the portable terminal and the area formation station that is a predetermined in-vehicle communication device among the multiple in-vehicle communication devices. When a predetermined coordinate calculation condition including a numerical number of in-vehicle communication devices configured to communicate with the portable terminal is satisfied, the position coordinate calculation portion calculates the position coordinate of the portable terminal; When the coordinate calculation condition is not satisfied, the area inside-outside determination portion determines whether the portable terminal is present inside the system actuation area.

According to one example embodiment, when the coordinate calculation condition is satisfied, a position coordinate calculation portion calculates a position coordinate of the portable terminal by combining the distance information generated by the three or more in-vehicle communication devices and an installation position of each in-vehicle communication device that has generated the distance information; and Therefore, it is possible to specify the detailed position of the portable terminal. Further, when the coordinate calculation condition is not satisfied, that is, when the number of in-vehicle communication devices capable of communicating with the portable terminal is less than three, the area inside-outside determination portion determines whether the portable terminal is inside the system actuation area by using the communication status between the in-vehicle communication device as the area formation station and the portable terminal. The determination of whether the portable terminal is present inside the system actuation area is decided based on the distance from the portable terminal to the area formation station corresponding to the system actuation area to be determined.

Therefore, even when the in-vehicle communication device other than the area formation station has not received the signal from the portable terminal, it is possible to determine whether the portable terminal is present inside the system actuation area to be determined as long as the area formation station can communicate with the portable terminal. That is, it is possible to reduce a possibility that the position of the portable terminal becomes unknown. Further, the above-described configuration can be implemented without increasing the number of in-vehicle communication devices. Therefore, it is possible to reduce the possibility that the position of the portable terminal becomes unknown while preventing the cost from increasing.

Embodiment

Hereinafter, as one example of an embodiment of a vehicular position estimation system of the present disclosure, a vehicular electronic key system to which the vehicular position estimation system is applied will be described with reference to the drawings. As shown in FIG. 1, the vehicular electronic key system according to the present disclosure includes an in-vehicle system 1 mounted on a vehicle Hv and a portable terminal 2 that is a communication terminal carried by a user of the vehicle Hv. Hereafter, the vehicle Hv on which the in-vehicle system 1 is mounted is also referred to as a subject vehicle.

<Overall Configuration>

The in-vehicle system 1 and the portable terminal 2 can execute an UWB (Ultra Wide Band-Impulse Radio) type wireless communication (hereinafter, UWB communication). That is, the in-vehicle system 1 and the portable terminal 2 can transmit and receive impulse-shaped electric waves (hereinafter, impulse signals) used in UWB communication. The impulse signals used in the UWB communication has a pulse width of an extremely short time (for example, 2 nanoseconds) and has a bandwidth of 500 MHz or more (that is, an ultra wide bandwidth).

Frequency bands that can be used in the UWB communication (hereinafter, the UWB band) include 3.2 GHz to 10.6 GHz, 3.4 GHz to 4.8 GHz, 7.25 GHz to 10.6 GHz, 22 GHz to 29 GHz, and the like. Among these various frequency bands, the impulse signal in the present embodiment is implemented using electric waves in the band of 3.1 GHz to 10.6 GHz. The frequency band used for the impulse signal may be selected in accordance with the country in which the vehicle Hv is used. It is only required that the bandwidths of the impulse signals are 500 MHz or more, and the impulse signals may have bandwidths of 1.5 GHz or more.

As a modulation method for the UWB-IR communication, various methods such as a PPM (pulse position modulation) method for modulating at a pulse generation position can be adopted. Specifically, an OOK (On Off keying) method, a PWM (Pulse Width Modulation) method, a PAM (Pulse-Amplitude Modulation) method, a PCM (Pulse-Code Modulation), and the like can be adopted. The on-off keying method is a method of expressing information (for example, 0 and 1) by the presence or absence of an impulse signal, and the pulse width modulation method is a method of expressing information by a pulse width. The pulse-amplitude modulation method is a method of expressing information by the amplitude of an impulse signal. The pulse-code modulation method is a method of expressing information by combining pulses.

Further, the in-vehicle system 1 and the portable terminal 2 of the present embodiment can execute a wireless communication (hereinafter, BLE communication) compliant with a Bluetooth Low Energy standard (Bluetooth is a registered trademark) as a second communication method. A first communication method is the above-described UWB communication. As the second communication method, in addition to the Bluetooth Low Energy, various short distance wireless communication methods such as, for example, a Wi-Fi (registered trademark) and ZigBee (registered trademark) can be adopted. In the short distance wireless communication method, a communication distance can be set to about 10 meters. The second communication method may be any one that can provide a communication distance of, for example, several meters to several tens of meters. Hereinafter, in order to distinguish an impulse signal of the UWB communication from a wireless signal of the BLE communication signal, the wireless signal compliant with the BLE standard is also referred to a BLE signal. Hereinafter, the specific configurations of the in-vehicle system 1 and the portable terminal 2 will be described in order.

<Configuration of Mobile Terminal>

First, the configuration and the operations of the portable terminal 2 will be described. The portable terminal 2 is associated with the in-vehicle system 1, and is a device that functions as an electronic key of the vehicle Hv. The portable terminal 2 can be implemented using a communication terminal which is applied to various purposes. For example, the portable terminal 2 is a smartphone. The portable terminal 2 may be an information process terminal such as a tablet terminal. Further, the portable terminal 2 may be a rectangular, elliptical (fob type), or card type small device conventionally known as a smart key. In addition, the portable terminal 2 may be configured as a wearable device worn on a finger, arm, or the like of a user.

Figure 2:
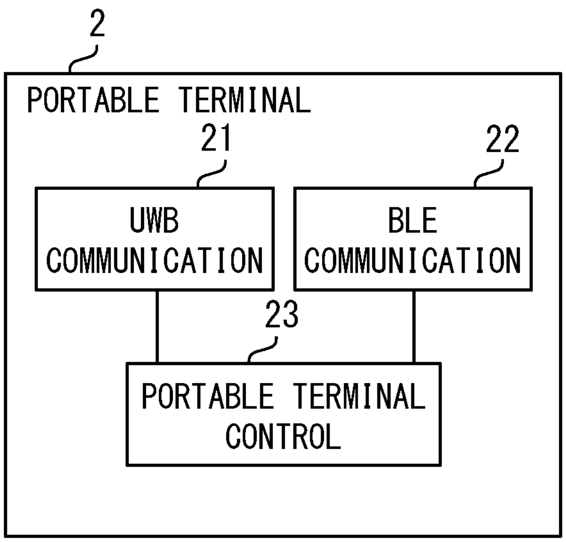
FIG. 2 is a functional block diagram for describing a configuration of a mobile terminal.

As shown in FIG. 2, the portable terminal 2 includes an UWB communication portion 21, a BLE communication portion 22, and a portable terminal controller 23. The portable terminal controller 23 is connected to each of the UWB communication portion 21 and the BLE communication portion 22 so as to communicate with each other.

The UWB communication portion 21 is a communication module for transmitting and receiving the impulse signal of the UWB. The UWB communication portion 21 generates a modulation signal while electrically processing a baseband signal input from the portable terminal controller 23 such as modulating the baseband signal, and transmits this modulation signal by the UWB communication. The modulation signal is a signal obtained by modulating transmission data by a predetermined modulation method (for example, PCM modulation method). The modulated signal is a signal sequence (hereinafter, pulse sequence signal) in which multiple impulse signals are arranged at time intervals corresponding to the transmission data. Further, when receiving the series of modulation signals (that is, pulse sequence signal) composed of multiple impulse signals transmitted from the in-vehicle system 1, the UWB communication portion 21 demodulates the reception signal and restores data before modulation. Then, the reception data is output to the portable terminal controller 23.

Further, the UWB communication portion 21 includes, as an operation mode, a reflection response mode and a normal mode. When the UWB communication portion 21 in the reflection response mode receives the impulse signal, the UWB communication portion 21 returns the impulse signal reflexively (in other words, immediately or as soon as possible). Whether to operate in the reflection response mode is switched by the portable terminal controller 23 based on, for example, an instruction signal from the in-vehicle system 1. It takes a predetermined time (hereinafter, response processing time Tb) from the reception of the impulse signal from the in-vehicle system 1 to the transmission of the impulse signal as the response signal by the portable terminal 2. The response processing time Tb is determined in accordance with a hardware configuration of the portable terminal 2. An assumed value of the response processing time Tb can be specified in advance by a test or the like.

A normal mode is a mode in which, after a series of pulse sequence signals from the preamble to the end are received, a response signal in accordance with the content of reception data is returned. The portable terminal 2 in the reflection response mode may generate the response signal of the content of the reception data and return the response signal after reflexively returning the series of impulse signals similarly to the pulse sequence signal transmitted from the in-vehicle system 1.

The BLE communication portion 22 is a communication module for executing the BLE communication. The BLE communication portion 22 is connected to the portable terminal controller 23 so as to communicate with each other. The BLE communication portion 22 receives the BLE signal transmitted from the vehicle Hv and provides the BLE signal to the portable terminal controller 23, and modulates data input from the portable terminal controller 23 and transmits the data to the vehicle Hv.

The portable terminal controller 23 controls the operation of the UWB communication portion 21 or the BLE communication portion 22. The portable terminal controller 23 is implemented using, for example, a computer provided with a CPU, a RAM, and a ROM.

The portable terminal controller 23 wirelessly transmits a wireless signal including transmission source information to the BLE communication portion 22 at predetermined transmission intervals. Thereby, the mobile terminal controller notifies the in-vehicle system 1 and the like of the own existence (that is, advertises the own existence). Hereinafter, for convenience, the wireless signal periodically transmitted for advertising is referred to as an advertisement signal. The transmission source information is, for example, unique identification information (hereinafter, referred to as a terminal ID) preliminarily assigned to the portable terminal 2. The terminal ID functions as information for identifying the portable terminal 2 from another communication terminal. The in-vehicle system 1 recognizes that the portable terminal 2 exists within the BLE communication range of the vehicle Hv by receiving this advertisement signal. In a different aspect, the portable terminal 2 may transmit the advertisement signal based on the request from the in-vehicle system 1. Further, when receiving the reception data from the BLE communication portion 22, the portable terminal controller 23 generates the baseband signal corresponding to the response signal in accordance with this reception data, and outputs this baseband signal to the BLE communication portion 22.

Further, when receiving the reception data from the UWB communication portion 21, the portable terminal controller 23 generates the baseband signal corresponding to the response signal in accordance with this reception data, and outputs this baseband signal to the UWB communication portion 21. The baseband signal output from the portable terminal controller 23 to the UWB communication portion 21 is modulated by the UWB communication portion 21, and is transmitted as the wireless signal.

<In-Vehicle System>

Next, functions and configurations of the configuration of the in-vehicle system 1 will be described. The in-vehicle system 1 implements a passive entry passive start system (hereinafter, PEPS system) by wirelessly communicating with the portable terminal 2. For example, the in-vehicle system 1 executes the control such as unlocking or locking of a door based on a user operation on a door button 14 described later when it has been confirmed that the portable terminal 2 is present in the vicinity of a door of the vehicle Hv. Further, the in-vehicle system 1 executes a start control of the engine based on the user operation on a start button 15 described later when it has been confirmed that the portable terminal 2 exists in the vehicle interior by the wireless communication with the portable terminal 2.

Hereinafter, an area, in which the in-vehicle system 1 operates as the PEPS system, such as the vicinity of the door or a vehicle interior is referred to as a system actuation area The system actuation area can be subdivided into a locking-unlocking area that permits the locking and the unlocking of the vehicle and a starting area that permits the starting of the engine. For example, the system actuation area (for example, the vicinity of the door for a driver seat or a passenger seat) formed outside the vehicle corresponds to the locking-unlocking area. The system actuation area formed inside the vehicle corresponds to the starting area. The vicinity of the door is a range within a predetermined vehicle exterior actuation distance from an outer door handle.

Figure 3:
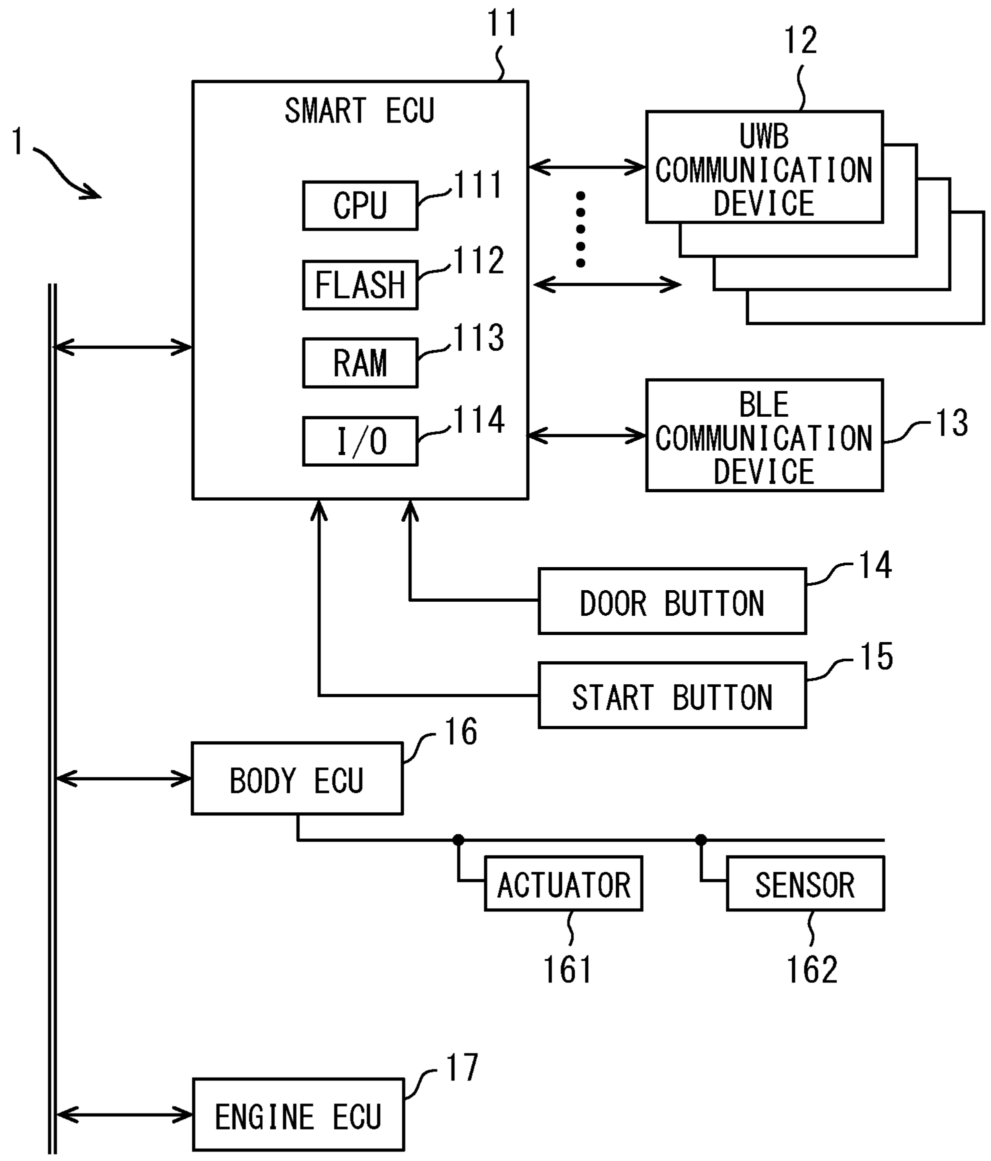
FIG. 3 is a functional block diagram for describing a configuration of an in-vehicle system.

As shown in FIG. 3, the in-vehicle system 1 includes a smart ECU 11, multiple UWB communication devices 12, a BLE communication device 13, the door button 14, the start button 15, a body ECU 16, and an engine ECU 17. Further, the in-vehicle system 1 also includes a body actuator 161, an in-vehicle sensor 162, and the like. The ECU used in the names is an abbreviation for Electronic Control Unit, and means an electronic control device.

The smart ECU 11 is an ECU that specifies a relative position of the portable terminal 2 with respect to the vehicle Hv by wirelessly communicating with the portable terminal 2 via the UWB communication device 12 or the BLE communication device 13 and performs a vehicle control such as the locking and the unlocking of the door or starting of the engine. The smart ECU 11 is mutually connected to the body ECU 16, and the engine ECU 17 via a communication network constructed in the vehicle. Further, the smart ECU 11 is electrically connected to the UWB communication device 12, the BLE communication device 13, the door button 14, and the start button 15. The smart ECU 11 is implemented by using, for example, a computer. That is, the smart ECU 11 includes a CPU 111, a flash memory 112, a RAM 113, an I/O 114, a bus line connecting these configurations, and the like.

A terminal ID assigned to the portable terminal 2 owned by the user is registered in the flash memory 112. Further, the flash memory 112 stores a program (hereinafter, referred to as a position estimation program) for causing a computer to function as the smart ECU 11, and the like. The above-described position estimation program may be stored in a non-transitory tangible storage medium. Executing the position estimation program by the CPU 111 corresponds to executing a method corresponding to the position estimation program.

The smart ECU 11 of the present embodiment includes, as an operation mode, a three-dimensional position estimation mode and an area determination mode. The three-dimensional position estimation mode is an operation mode that specifies a relative three-dimensional position coordinate of the portable terminal 2 with respect to the vehicle Hv and performs the vehicle control in accordance with the position. The three-dimensional position estimation mode corresponds to an operation mode that determines a position of the portable terminal 2 by using a combination of distance information observed by the multiple UWB communication devices 12. The area determination mode is an operation mode that roughly determines a region (hereinafter, a presence area) in which the portable terminal 2 is present without specifying the relative three-dimensional position coordinate of the portable terminal 2 with respect to the vehicle Hv. The area determination mode is an operation mode that determines the presence area of the portable terminal 2 by individually using the distance information observed by each UWB communication device 12 without combining the distance information with distance information observed by other UWB communication devices 12. The smart ECU 11 will be described in detail later.

The UWB communication device 12 is a communication module for performing UWB communication with the portable terminal 2. Each of the multiple UWB communication devices 12 can execute the UWB communication with a different UWB communication device 12 mounted on the vehicle Hv. That is, each UWB communication device 12 can wirelessly communicate with the portable terminal 2 and the different UWB communication device 12. For convenience, another UWB communication device 12 for a certain UWB communication device 12 is referred to as a different device. The UWB communication device 12 corresponds to an in-vehicle communication device.

Each UWB communication device 12 is connected to the smart ECU 11 via a dedicated communication line or an in-vehicle network so as to mutually communicate with the smart ECU 11. The operation of each UWB communication device 12 is controlled by the smart ECU 11. Each UWB communication device 12 is assigned with a unique communication device number. The communication device number functions as information for identifying the multiple UWB communication devices 12. Attachment positions or electrical configurations of the multiple UWB communication devices 12 will be described later.

The BLE communication device 13 is a communication module for executing the BLE communication. The BLE communication device 13 is connected to the smart ECU 11 so as to communicate with each other. The BLE communication device 13 receives the BLE signal transmitted from the portable terminal 2, and provides the BLE signal to the smart ECU 11. Further, the BLE communication device 13 modulates the data input form the smart ECU 11 and wirelessly transmits the data to the portable terminal 2. The BLE communication device 13 is attached to an arbitrary position of the vehicle Hv. For example, the BLE communication device 13 is attached to an instrument panel, an upper end portion of a windshield, a C-pillar (in other words, rear pillar), a rocker portion, and the like. The number of the BLE communication devices 13 may be one or plural.

The door button 14 is a button for the user to unlock and lock the door of the vehicle Hv. The door button 14 is placed on, for example, an outer door handle of each door of the vehicle Hv. The outer door handle is a gripping member provided on the outer side surface of the door for opening and closing the door. The door button 14 outputs the electric signal indicating that the button is pressed by the user to the smart ECU 11. The door button 14 corresponds to a configuration for the smart ECU 11 to receive the unlocking instruction and the locking instruction from the user. A touch sensor may be used as the configuration for receiving at least one of the unlocking instruction or the locking instruction from the user. The touch sensor is a device that detects a touch on the door handle made by the user.

The start button 15 is a push switch for example that enables the user to start a driving source (for example, engine) of the vehicle Hv. When the user performs a push operation on the start button 15, the start button 15 outputs an electrical signal indicating the push operation to the smart ECU 11. As an example, the vehicle Hv is a vehicle provided with an engine as the driving source, but it is not limited to this example. The vehicle Hv may be an electric vehicle or a hybrid vehicle. When the vehicle Hv is a vehicle provided with a motor as the driving source, the start button 15 is a switch for starting the motor for driving.

The body ECU 16 is an ECU that controls the body actuator 161 in response to a request from the smart ECU 11. The body ECU 16 is communicably connected to various body actuators 161 and various in-vehicle sensors 162. Here, the body actuator 161 is, for example, a door lock motor configuring a locking mechanism of each door, a seat actuator for adjusting a seat position, or the like. Further, the in-vehicle sensors 162 described here is a courtesy switch or the like equipped to each door. The courtesy switches are sensors that detect opening and closing of the door. The body ECU 16, for example, outputs a predetermined control signal to the door lock motors provided on the respective doors of the vehicle Hv based on a request from the smart ECU 11, thereby locking and unlocking the doors of the vehicle Hv.

The engine ECU 17 is an ECU configured to control an operation of the engine mounted on the vehicle Hv. For example, when the engine ECU 17 acquires a start instruction signal that instructs starting of the engine from the smart ECU 11, the engine ECU 17 starts the engine.

<Attachment Position and Electrical Configuration of Each UWB Communication Device>

Figure 4:
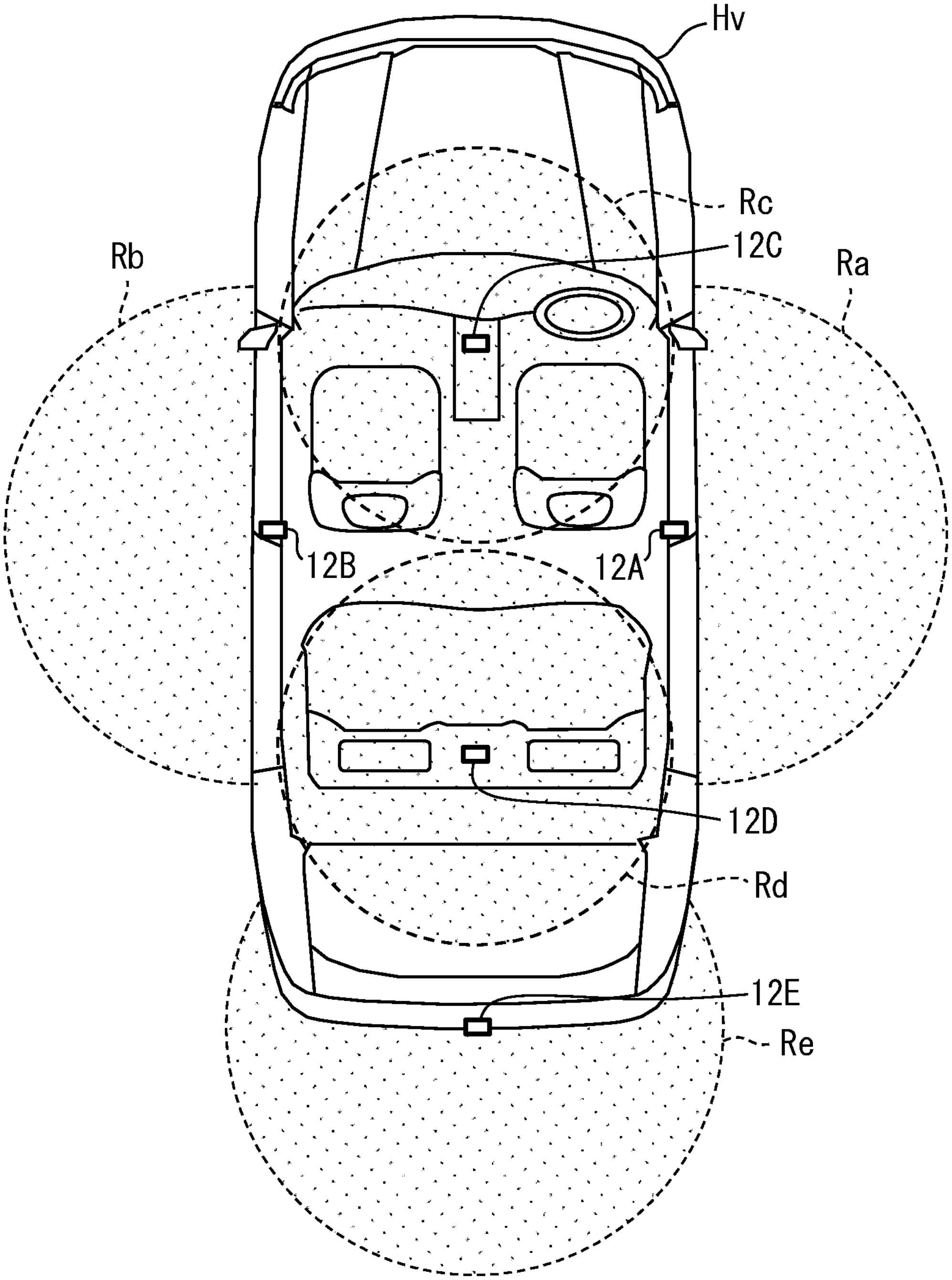
FIG. 4 is a diagram for describing one example of a mounting position of an UWB communication device.

As shown in FIG. 4, the in-vehicle system 1 of the present embodiment includes, as the UWB communication devices 12, a right communication device 12A, a left communication device 12B, a front communication device 12C, a rear communication device 12D, and a rear end communication device 12E. In FIG. 4, a roof portion is transparent to clearly indicate the attachment positions of the UWB communication device 12

The right communication device 12A is an UWB communication device 12 for forming a right area Ra as a system actuation area on the right side of the vehicle. A region within a predetermined vehicle exterior actuation distance from the right communication device 12A corresponds to the right area Ra. The vehicle exterior actuation distance is, for example, 0.7 meters. Of course, the vehicle exterior actuation distance may be 1 meter, or may also be 1.5 meter. The vehicle exterior actuation distance is preferably set to be smaller than 2 meters from the viewpoint of crime prevention. The right communication device 12A is placed, for example, in an upper region of a B-pillar (in other words, center pillar) on the right side of the vehicle. The upper region of the pillar is a region that is the upper half of the pillar. The upper region of the pillar also includes the upper end of the pillar. The right communication device 12A is required to be attached so that the vicinity of the door on the right side of the vehicle functions as the right area Ra, and the specific attachment position can be changed.

The left communication device 12B is an UWB communication device 12 for forming a left area Rb as a system actuation area on the left side of the vehicle. An area within the vehicle exterior actuation distance from the left communication device 12B corresponds to the left area Rb. The left communication device 12B is placed in, for example, the upper region of the B-pillar on the left side of the vehicle. The left communication device 12B is required to be attached so that the vicinity of the door on the left side of the vehicle functions as the left area Rb, and the specific attachment position can be changed.

The front communication device 12C is an UWB communication device 12 for forming a front seat area Rc as the system actuation area in a space for the front seat. A region within a front seat actuation distance from the front communication device 12C corresponds to the front seat area Rc. The space for the front seat is a vehicle interior space in front of the backrest of the front seat (or center pillar), and includes a dashboard. The front seat actuation distance that defines the size of the front seat area Rc may be set to a value that roughly covers, inside the vehicle, the space for the front seat. For example, the front seat actuation distance is set to about 0.6 meters so that the front seat area Rc does not protrude to the right side or left side. The front communication device 12C is placed, for example, in the vicinity of a rearview mirror (in other words, an upper end of a windshield).

The rear communication device 12D is an UWB communication device 12 for forming a rear seat area Rd as the system actuation area in a space for the rear seat. A region within a predetermined rear seat actuation distance from the rear communication device 12D corresponds to the rear seat area Rd. The space for the rear seat is a vehicle interior space behind the backrest of the front seat (or center pillar). The rear seat actuation distance that defines the size of the rear seat region may be set to a value that roughly covers, inside the vehicle, the space for the rear seat. For example, the rear seat actuation distance is set to about 0.6 meters so that the rear seat region does not protrude to the right side or left side. The rear communication device 12D is, for example, attached to a center portion, in a vehicle width direction, of a ceiling located above a rear seat. A region within a certain rear seat actuation distance from the rear communication device 12D is, hereinafter, referred to as a rear seat region.

The rear end communication device 12E is an UWB communication device 12 for forming a rear area Re as a system actuation area in the vicinity of a trunk door placed at a rear end of the vehicle. An area within the vehicle exterior actuation distance from the rear end communication device 12E corresponds to the rear area Re. The rear end communication device 12E is attached in the vicinity of a door handle for a trunk. The vicinity of the door handle for the trunk is a region within, for example, 30 meters from the trunk door. The vicinity of the door for the trunk also includes the inside of the door handle for the trunk.

Each of the right area Ra, the left area Rb, the rear area Re, the front seat area Rc, and the rear seat area Rd corresponds to the system actuation area. That is, the in-vehicle system 1 of the present embodiment includes multiple system actuation areas determined based on an installation position of each UWB communication device 12. The right communication device 12A corresponds to an area formation station that defines the center of the right area Ra. The left communication device 12B corresponds to an area formation station of the left area Rb. The front communication device 12C corresponds to an area formation station of the front seat area Rc. The rear communication device 12D corresponds to an area formation station of the rear seat area Rd. The rear end communication device 12E corresponds to an area formation station of the rear area Re. The area formation station corresponds to an UWB communication device 12 located in the center of the system actuation area. The vehicle exterior actuation distance, the front seat actuation distance, and the rear seat actuation distance correspond to the system actuation distance.

Communication device position data indicating the installation position of each UWB communication device 12 is stored in the flash memory 112. The installation position of each UWB communication device 12 in the vehicle Hv may be expressed as a point of a three-dimensional orthogonal coordinate system in which an arbitrary point of the vehicle is set to a reference point (in other words, the origin). Here, as one example, the center of the front wheel axle is set to the origin, and the installation position is represented as a point on a three-dimensional coordinate system (hereinafter, vehicular three-dimensional coordinate system) having X, Y, and Z axes orthogonal to each other. The X-axis forming the vehicular three dimensional coordinate system is parallel to a vehicle width direction, and the right side of the vehicle represents a positive direction of the X-axis. The Y-axis is parallel to the vehicular front-rear direction. The front of the vehicle represents a positive direction of the Y-axis. The Z-axis is parallel to the vehicular height direction. The above of the vehicle represents a positive direction of the Z-axis. The center of the three-dimensional coordinate system can be changed as appropriate, for example, changed to the center of the rear wheel axle. Of course, as another aspect, the mounting position of each UWB communication device 12 may be represented by polar coordinates. The placement position of each UWB communication device 12 may be stored in association with the communication device number.

Figure 5:
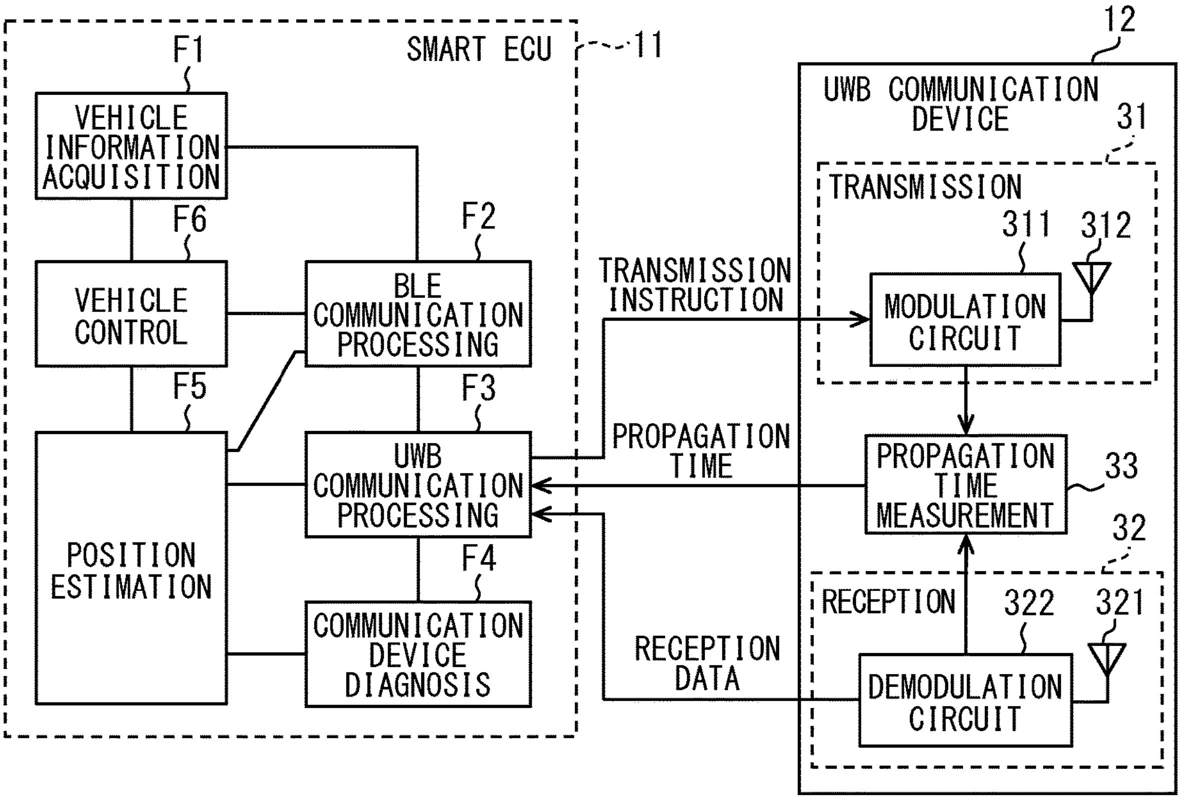
FIG. 5 is a block diagram showing configurations of a smart ECU and the UWB communication device.

Each of the multiple UWB communication devices 12 includes, as shown in FIG. 5, a transmission portion 31, a reception portion 32, and a propagation time measurement portion 33. The transmission portion 31 generates the impulse signal while electrically processing the impulse signal such as modulating the baseband signal input from the smart ECU 11, and radiates this impulse signal as the electric wave. The transmission portion 31 is implemented using, for example, a modulation circuit 311 and a transmission antenna 312.

The modulation circuit 311 is a circuit that modulates the baseband signal input from the smart ECU 11. The modulation circuit 311 generates a modulation signal corresponding to the data (hereinafter, transmission data) indicated by the baseband signal input from the smart ECU 11, and transmits the modulation signal to the transmission antenna 312. The modulation signal is a signal obtained by modulating transmission data by a predetermined modulation method. As described above, the modulation signal of the present embodiment corresponds to a signal sequence in which multiple impulse signals are arranged at time intervals in accordance with transmission data. The modulation circuit 311 includes a circuit that generates an electric impulse signal (hereinafter, a pulse generation circuit) and a circuit that amplifies or shapes the impulse signal.

The transmission antenna 312 converts the electric impulse signal output from the modulation circuit 311 into an electric wave and radiates the electric wave into space. That is, the transmission antenna 312 radiates a pulse-like electric wave having a predetermined bandwidth in the UWB band as an impulse signal. Further, when the modulation circuit 311 outputs the electric impulse signal to the transmission antenna 312, at the same time, the modulation circuit 311 outputs a signal (hereinafter, a transmission notification signal) indicating that the impulse signal is output, to the propagation time measurement portion 33.

The transmission portion 31 of the present embodiment is configured so that a rise time of the impulse signal is 1 nanosecond. The rise times the time required for a signal intensity to exceed 90% of the maximum amplitude after the signal intensity exceeds 10% of the maximum amplitude for the first time. The rise time of the impulse signal is determined in accordance with the hardware configuration such as the circuit configuration of the transmission portion 31. The rise time of the impulse signal can be specified by a simulation or a real test. A rise time Tr of an impulse signal used in the UWB communication is typically approximately 1 nanosecond.

The reception portion 32 includes, for example, a reception antenna 321 and a demodulation circuit 322. The reception antenna 321 is an antenna for receiving an impulse signal. The reception antenna 321 outputs an electric impulse signal corresponding to the impulse signal transmitted by the portable terminal 2 to the demodulation circuit 322.

When the reception antenna 321 receives the impulse signal used in the UWB communication, the demodulation circuit 322 generates a reception signal while electrically processing the signal, such as demodulating the signal, and outputs the reception signal to the smart ECU 11. The pulse sequence signal acquired by the demodulation circuit 322 is a signal obtained by arranging multiple impulse signals input from the reception antenna 321 in time series at actual reception intervals. The demodulation circuit 322 demodulates a series of modulated signals (that is, pulse sequence signals) including multiple impulse signals transmitted from the portable terminal 2 or the different device, and restores the data before modulation.

The demodulation circuit 322 includes a frequency conversion circuit that converts the frequency of the impulse signal received by the reception antenna 321 into the baseband and outputs a signal in the baseband, an amplification circuit that amplifies a signal level, and the like. In addition, when the impulse signal is input from the reception antenna 321, the reception portion 32 outputs a signal indicating reception of the impulse signal (hereinafter, reception notification signal) to the propagation time measurement portion 33.

The propagation time measurement portion 33 is a timer that measures a time (hereinafter, round trip time) until the reception portion 32 receives the impulse signal after the transmission portion 31 transmits the impulse signal. The timing at which the transmission portion 31 transmits the impulse signal is specified by the input of the transmission notification signal. Further, the timing at which the reception portion 32 receives the impulse signal is specified by the input of the reception notification signal. That is, the propagation time measurement portion 33 measures a time period from a time when the modulation circuit 311 outputs the transmission notification signal to a time when the demodulation circuit 322 outputs the reception notification signal. The round trip time corresponds to a time obtained by adding the response processing time of the communication partner to the signal flight time for the both-way.

The propagation time measurement portion 33 counts a clock signal input from a clock oscillator (not shown) to measure an elapsed time from the transmission portion 31 transmitting the impulse signal. The count by the propagation time measurement portion 33 is stopped when the reception notification signal is input or when a count value reaches a predetermined upper limit value, and the count value is output to the smart ECU 11. That is, the round trip time is reported to the smart ECU 11. When the round trip time is reported to the smart ECU 11, the count value of the propagation time measurement portion 33 returns to 0 (that is, is reset).

When the measurement of the round trip time is completed, the propagation time measurement portion 33 calculates the propagation time based on the round trip time and provides the propagation time to the smart ECU 11. The propagation time measurement portion 33 corresponds to a propagation time identification portion. The propagation time measurement portion 33 related to the calculation of the propagation time will be described later. The propagation time measurement portion 33 is implemented by using, for example, an IC. In addition, the UWB communication device 12 includes a reflection response mode similarly to the UWB communication portion 21 of the portable terminal 2. The reflection response mode of the UWB communication device 12 is similar to the reflection response mode of the UWB communication portion 21.

Here, the aspect of the UWB communication device 12 in which the antenna (that is, transmission antenna 312) for transmission and the antenna (that is, reception antenna 321) for reception are separated from each other has been described. However, the mode of the UWB communication device 12 is not limited to this. The UWB communication device 12 may include one antenna element for transmission and reception by using a directional coupler. Further, the modulation circuit 311 or the demodulation circuit 322 may be built in the IC that provides a function as the propagation time measurement portion 33. The UWB communication device 12 may be implemented by one antenna and one dedicated IC having various circuit functions.

<Function of Smart ECU>

The smart ECU 11 programs a function corresponding to various functional blocks shown in FIG. 5 by executing the above described position estimation program. That is, the smart ECU 11 includes, as functional blocks, a vehicle information acquisition portion F1, a BLE communication processing portion F2, an UWB communication processing portion F3, a communication device diagnosis portion F4, a position estimation portion F5, and a vehicle controller F6.

The vehicle information acquisition portion F1 acquires various pieces of information indicating the state of the vehicle Hv (hereinafter, referred to as vehicle information) from sensors, ECUs (for example, body ECU 16), switches, and the like mounted on the vehicle Hv. The vehicle information includes, for example, an open-closed state of the door, a locked-unlocked state of each door, whether the door button 14 is pressed, whether the start button 15 is pressed, or the like. The vehicle information acquisition portion F1 specifies a current state of the vehicle Hv based on the various information described above. For example, when the engine is off and all of the doors are locked, the vehicle information acquisition portion F1 determines that the vehicle Hv is in a parked state. Of course, the condition for determining that the vehicle Hv is parked may be designed as appropriate, and various determination conditions can be applied.

The acquisition of the information indicating the locked-unlocked state of each door corresponds to the determination of the locked-unlocked state of each door and the detection of the locking operation-unlocking operation of the door by the user. Further, the acquisition of electric signals from the door button 14 and the start button 15 corresponds to detection of the user operation on those buttons. That is, the vehicle information acquisition portion F1 corresponds to a configuration for detecting the user operation on the vehicle Hv, such as opening and closing of the door, pressing of the door button 14, pressing of the start button 15, and the like. The vehicle information described hereinafter includes the user operation on the vehicle Hv. In addition, the types of information included in the vehicle information are not limited to the examples described above. The vehicle information also includes a shift position detected by a shift position sensor (not shown), a detection result of a brake sensor for detecting depression operation on a brake pedal, and the like. The operation state of the parking brake may also be included in the vehicle information.

The BLE communication processing portion F2 performs transmission and reception of data to and from the portable terminal 2 in cooperation with the BLE communication device 13. For example, the BLE communication processing portion F2 generates data addressed to the portable terminal 2, and outputs the data to the BLE communication device 13. Thereby, the BLE communication processing portion F2 transmits a signal corresponding to the data as the electric wave. Further, the BLE communication processing portion F2 receives data received by the BLE communication device 13 from the portable terminal 2. In the present embodiment, as a more preferable example, the wireless communication between the smart ECU 11 and the portable terminal 2 is executed in an encrypted manner. As an encryption method of the encrypted communication, various methods, such as an encryption method defined by Bluetooth can be used.

In the present embodiment, the smart ECU 11 and the portable terminal 2 encrypt and perform a data communication for authentication or the like in order to improve security. However, it is not limited to this. As another aspect, the smart ECU 11 and the portable terminal 2 may perform the data communication without encryption.

The BLE communication processing portion F2 executes a process pf confirming that the communication partner is the portable terminal 2 of the user (in other words, authenticating the portable terminal 2) in cooperation with the BLE communication device 13. The authentication process itself may be executed by various methods such as a challenge-response method. Here, a detailed description of the authentication process will be omitted here. It is assumed that data (for example, encryption key) or the like required for the authentication process is stored in each of the portable terminal 2 and the smart ECU 11. A state where the authentication of the portable terminal 2 is successful corresponds to a state where a communication connection with the portable terminal 2 is established.

The BLE communication processing portion F2 recognizes that the user is present in the vicinity of the vehicle Hv based on the establishment of the BLE communication with the portable terminal 2. Further, the BLE communication processing portion F2 acquires the terminal ID of the communicably connected portable terminal 2 from the BLE communication device 13. According to such a configuration, even when the vehicle Hv is a vehicle shared by multiple users, the smart ECU 11 can specify a user who is present in the vicinity of the vehicle Hv based on the terminal ID of the portable terminal 2 to which the BLE communication device 13 is communicatively connected.

The smart ECU 11 of the present embodiment authenticates the portable terminal 2 by the BLE communication as one example. However, it is not limited this. The authentication process of the portable terminal 2 (or the user) by the smart ECU 11 may be executed by the UWB communication. The smart ECU 11 may execute the authentication process at a predetermined cycle while the BLE communication device 13 and the portable terminal 2 are in communication connection. Further, the smart ECU 11 may be configured such that the encrypted communication for the authentication process is executed by using a predetermined user operation on the vehicle Hv as a trigger, in response to a pressing operation made on the start button 15 by the user or the like.

The UWB communication processing portion F3 transmits data to the portable terminal 2 and receives data from the portable terminal 2 in cooperation with the UWB communication device 12. The UWB communication processing portion F3 acquires data received by the UWB communication device 12, from the portable terminal 2. In addition, the UWB communication processing portion F3 generates the data addressed to the portable terminal 2, and outputs the data to the UWB communication device 12. Thereby, the pulse sequence signal corresponding to the predetermined data is wirelessly transmitted. Further, the UWB communication processing portion F3 causes an arbitrary UWB communication device 12 to transmit the impulse signal based on instructions from the communication device diagnosis portion F4 or the position estimation portion F5. The UWB communication device 12 caused to transmit the impulse signal is selected by the communication device diagnosis portion F4 or the position estimation portion F5.

The communication device diagnosis portion F4 determines whether each UWB communication device 12 normally operates (in other words, whether a failure has occurred). The communication device diagnosis portion F4 detects the failure of the UWB communication device 12 by, for example, sequentially causing each UWB communication device 12 to wirelessly communicate with the different device. Here, a state where the failure occurs includes a state where the operation has stopped due to the malfunction.

For example, the communication device diagnosis portion F4 determines, as a result obtained by the wireless communication of the UWB communication device 12 (hereinafter, diagnosis target device) to be diagnosed with multiple different devices, that the diagnosis target device has malfunctioned when a miss rate of the communication with the different device is equal to or higher than a threshold. The diagnosis target devices may be changed in a predetermined order. In a case where multiple calculation processes can be executed in parallel such as a case where the smart ECU 11 includes, for example, multiple processors, multiple UWB communication devices 12 may be set to the diagnosis target device at the same time, and the multiple UWB communication devices 12 may be diagnosed in parallel.

Further, the communication device diagnosis portion F4 can detect the malfunction of the UWB communication device 12 by using various procedures such as a watchdog timer procedure and an assignment answer procedure. The watchdog timer procedure is a procedure that determines that the UWB communication device 12 has malfunctioned when a watchdog timer of the smart ECU 11 expires without being cleared by a watchdog pulse input from the UWB communication device 12. The watchdog timer may be prepared for each UWB communication device 12. Further, the assignment answer procedure is a procedure in which the smart ECU 11 as the communication device diagnosis portion F4 transmits a predetermined monitoring signal to the diagnosis target device and determines whether the answer returned from the diagnosis target device is normal. In the assignment answer procedure, the UWB communication device 12 as the diagnosis target device generates answer data for the monitoring signal input from the smart ECU 11 and returns the answer data to the smart ECU 11. The smart ECU 11 determines that the UWB communication device 12 does not normally operate when the answer data from the UWB communication device 12 is different from correct data in accordance with the transmitted monitoring signal or when the response signal is not returned from the smart ECU 11 within a predetermined limit time.

Further, the communication device diagnosis portion F4 measures an inter-communication distance for each combination of the UWB communication devices 12 by causing each UWB communication device 12 to wirelessly communicate with each different device in both directions in a predetermined order. Here, the inter-communication device distance is a distance from a certain UWB communication device 12 to a different device. The combination of the UWB communication devices 12 that performs the wireless communication in both directions may be appropriately designed. For example, the UWB communication devices 12 located within the sight of line may be registered in advance as the combination for performing the wireless communication in both directions for diagnosis.

Then, the communication device diagnosis portion F4 determines that the failure occurs in the diagnosis target device when, in all combinations of which configuration elements include the diagnosis target device, the inter-communication device distance is out of a predetermined normal range. In other words, the communication device diagnosis portion F4 determines that the diagnosis target device is normal when, in at least one combination among all combinations of which configuration elements include the diagnosis target device, the inter-communication distance is inside the normal range.

The normal range of the inter-communication distance for each combination of the UWB communication devices 12 is registered in the flash memory 112 by a test or a simulation. The normal range for each combination of the UWB communication devices 12 may be set with reference to a linear distance between the UWB communication devices 12. As another aspect, the normal range for each combination of the communication devices may be defined not by the distance but by a wireless signal propagation time (so called TOF: Time Of Flight). Various methods can be used as a method for measuring the distance between the communication devices or the wireless signal propagation time by performing the wireless communication between two communication devices. For example, the UWB communication device 12 is caused to transmit the impulse signal to the different UWB communication device 12 and receive the impulse signal from the different communication device 12 to measure the round trip time. Further, the propagation time may be calculated by dividing, by 2, a value obtained by subtracting a response processing time of the UWB communication device 12 on the response side from the measured round trip time.

The failure detected by using the inter-vehicle communication device distance includes, for example, a contact failure of a signal line inside the communication device with a circuit element, an amplifier failure, and the like. When the poor contact of the signal line or the amplifier is not operating, the reception level (in other words, reception sensitivity) of the impulse signal is lower than that in the normal state and the timing when the reception electric power of the impulse signal exceeds the predetermined detection threshold may be delayed by about 0.5 nanoseconds to 1 nanosecond. According to the above-described method, it is possible to detect the failure, which causes the minute delay of above several nanoseconds, inside the communication device. Further, according to the above-described diagnosis method, in addition to the malfunction inside the UWB communication device 12, it is possible to detect, as an abnormal state, a state where the UWB communication device 12 is removed from the predetermined installation position.

The bidirectional wireless communication (hereinafter, diagnosis wireless communication) for acquiring the inter-communication device distance for each combination of the UWB communication devices 12 may be performed periodically, for example, at a predetermined diagnosis cycle. The diagnosis cycle is, for example, 1 hour. Of course, in addition, the diagnosis wireless communication may be performed at a predetermined timing such as a timing when the vehicle Hv is parked, a timing when a predetermined time has elapsed after the vehicle Hv is parked, or a timing when the user's approach to the vehicle Hv is detected. It is preferable that the diagnosis wireless communication is performed when there is no occupant inside the vehicle such as when the vehicle is parked.

The smart ECU 11 as the communication device diagnosis portion F4 executes a predetermined recovery process such as restarting the IC of the UWB communication device 12 when the failure of the UWB communication device 12 is detected. When, after the recovery process is executed, the UWB communication device 12 does not return to the normal state, it is determined that the failure occurs in the UWB communication device 12, and the UWB communication device 12 is registered as the failure device in the flash memory 112. Whether each UWB communication device 12 is the failure device may be managed by using the communication device number. Hereinafter, for convenience, the UWB communication device 12 determined to be operating normally by the communication device diagnosis portion F4 is also referred to as a normal device.

Figure 6:
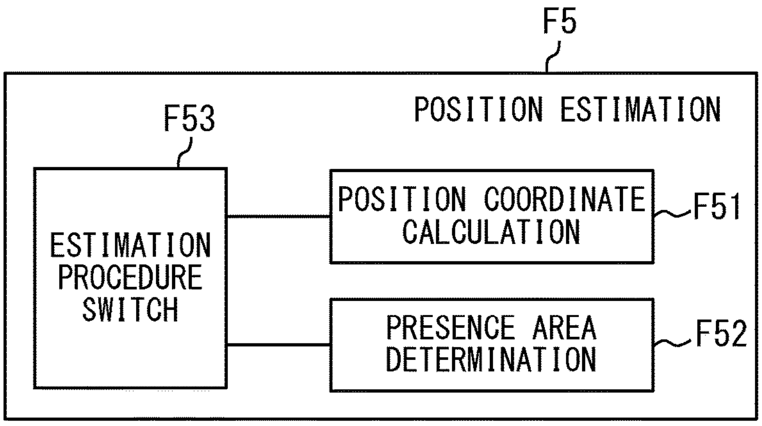
FIG. 6 is a block diagram illustrating a function of a position estimation portion.

The position estimation portion F5 executes a process of estimating the position of the portable terminal 2. The position estimation portion F5 sequentially estimates the position of the portable terminal 2, for example, in a state where the BLE communication device 13 establishes the communication connection with the portable terminal 2. As shown in FIG. 6, the position estimation portion F5 includes, as a finer function, a position coordinate calculation portion F51, a presence area determination portion F52, and an estimation procedure switch portion F53. The possibility that the portable terminal 2 is carried by the user at least outside the vehicle is high. Therefore, estimating the position of the portable terminal 2 corresponds estimating the position of the user.

The position coordinate calculation portion F51 calculates, as detailed position information of the portable terminal 2, a coordinate indicating the position of the portable terminal 2 with respect to the vehicle Hv in the three-dimensional space. The three-dimensional position of the portable terminal 2 with respect to the vehicle Hv is expressed by, for example, the vehicle three-dimensional coordinate system similar to a coordinate system indicating the communication device position. The position coordinate calculation portion F51 estimates the distance from each UWB communication device 12 to the portable terminal 2 by causing each UWB communication device 12 to transmit the impulse signal to the portable terminal 2 and receive the impulse signal from the portable terminal 2 in a predetermined order. Then, the position coordinate (in other words, three dimensional position) of the portable terminal 2 is estimated based on the distance information from each UWB communication device 12 to the portable terminal 2. The position coordinate calculation portion F51 will be described in detail later. The position coordinate calculation portion F51 corresponds to a first position estimation procedure.

The presence area determination portion F52 determines the presence area of the portable terminal 2 based on a communication status of each UWB communication device 12 with the portable terminal 2. The presence area determination portion F52 of the present embodiment determines which area of the right area Ra, the left area Rb, the rear area Re, the front seat area Rc, the rear seat area Rd and a prohibited area the portable terminal 2 exists in. Here, the prohibited area is a region outside the system actuation area, and corresponds to a region in which the operation as the PEPS system is prohibited. Such a presence area determination portion F52 does not calculate the position coordinate of the portable terminal 2. That is, the presence area determination portion F52 corresponds to a configuration that more loosely (in other words, coarsely/roughly) estimates the position of the portable terminal 2 as compared with the position coordinate calculation portion F51. The presence area determination portion F52 will be described in detail later. The presence area determination portion F52 corresponds to a second estimation procedure and an area inside-outside determination portion.

The estimation procedure switch portion F53 switches the procedure for estimating the position of the portable terminal 2 to a procedure using either the position coordinate calculation portion F51 or the presence area determination portion F52 or a procedure using both of them. Regarding the estimation procedure switch portion F53, when a predetermined coordinate calculation condition is satisfied, the smart ECU 11 estimates the position of the portable terminal 2 by using the position coordinate calculation portion F51. On the other hand, when the predetermined coordinate calculation condition is not satisfied, the presence area determination portion F52 is caused to determine the position of the portable terminal 2 instead of the position coordinate calculation portion F51.

The state, where the position coordinate calculation portion F51 is set to the position estimation procedure by the estimation procedure switch portion F53, corresponds to the above-described three-dimensional position estimation mode. Further, the state, where the presence area determination portion F52 is set to the position estimation procedure by the estimation procedure switch portion F53, corresponds to the area determination mode. Such an estimation procedure switch portion F53 corresponds to a configuration that determines whether the coordinate calculation condition is satisfied and switches the operation mode (specifically, position estimation procedure) of the smart ECU 11 based on the determination result. Here, as one example, when three or more UWB communication devices 12 can wirelessly communicate with the portable terminal 2, it is determined that the coordinate calculation condition is satisfied. The UWB communication device 12 that can wirelessly communicate with the portable terminal 2 is an UWB communication device 12 that has no failure and also can receive the impulse signal from the portable terminal 2. As another aspect, in regardless of whether the signal from the portable terminal 2 is received, the UWB communication device 12 having no failure may be regarded as the UWB communication device 12 that can wirelessly communicate with the portable terminal 2.

The vehicle controller F6 executes a vehicle control in accordance with the position of the portable terminal 2 (in other words, the user) and the state of the vehicle Hv in cooperation with the body ECU 16 or the like when the authentication of the portable terminal 2 is successful. The state of the vehicle Hv is determined by the vehicle information acquisition portion F1. The position of the portable terminal 2 is determined by the position estimation portion F5. For example, the vehicle controller F6 unlocks the lock mechanism of the door in cooperation with the body ECU 16 when the position estimation portion F5 determines that the portable terminal 2 is present in any of the right area Ra, the left area Rb, and the rear area Re and also it is detected that the door button 14 is pressed by the user. Further, for example, when the portable terminal 2 is determined to be present inside the vehicle by the position estimation portion F5 and it is detected that the start button 15 has been pressed by the user, the vehicle controller F6 starts the engine in cooperation with the engine ECU 17.

<Position Estimation Process>

Figure 7:
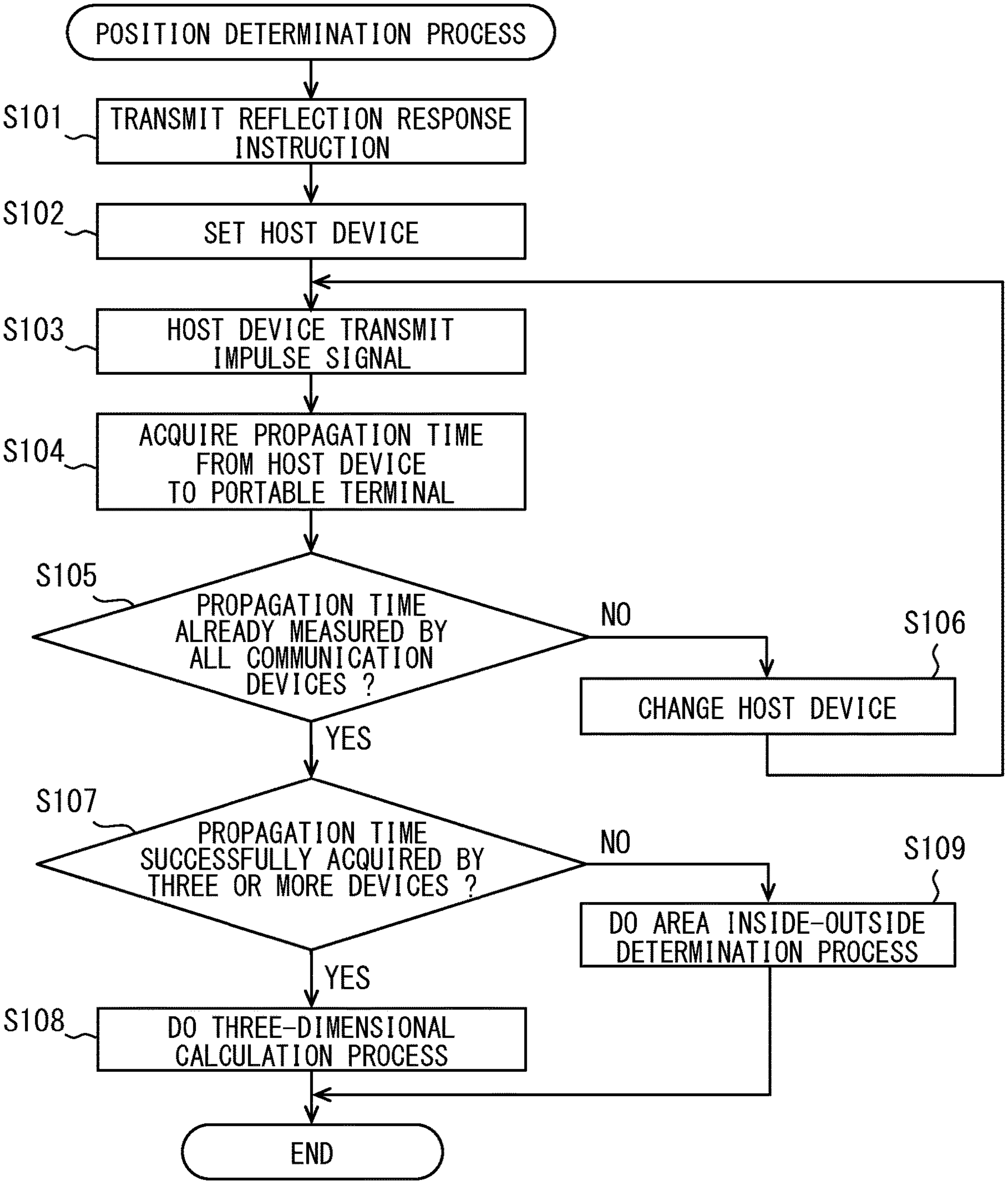
FIG. 7 is a flowchart of a position estimation process.

Next, the position estimation process executed by the smart ECU 11 will be described with reference to a flowchart shown in FIG. 7. The position estimation process is executed, for example, at a predetermined position estimation cycle in a state where the communication connection between the BLE communication devices 13 and the portable terminal 2 is established. The state where the communication connection of the BLE communication device 13 with the portable terminal 2 is established corresponds to a state where the authentication of the portable terminal 2 is successful. The position estimation cycle is, for example, 200 milliseconds. Of course, the position estimation cycle may be set to 100 milliseconds or 300 milliseconds. In the present embodiment, as one example, the position estimation process includes S101 to S109. Each process content is mainly executed by the position estimation portion F5 in cooperation with the UWB communication device 12, the BLE communication device 13, the BLE communication processing portion F2, the UWB communication processing portion F3, or the like.

First, in S101, in cooperation with the BLE communication processing portion F2, the BLE communication device 13 is caused to transmit a reflection response instruction signal. The reflection response instruction signal is a signal instructing the portable terminal 2 to operate in the reflection response mode. Thereby, the portable terminal 2 operates so as to reflexively return the impulse signal each time the portable terminal 2 receives the impulse signal transmitted from the in-vehicle system 1.

Next, in S102, an arbitrary UWB communication device 12 (that is, normal device) of which failure has not been detected by the communication device diagnosis portion F4 is set to a host device. The host device corresponds to the UWB communication device 12 that measures the round trip time among the multiple UWB communication devices 12. When the process in S102 is completed, S103 is executed.

In S103, the host device transmits the impulse signal. Thereby, in S104, a propagation time Ta that is a time until the portable terminal 2 receives the wireless signal transmitted by the host device is acquired. Then, the UWB communication device 12 other than the host device is controlled so as to stop the operation or so as not to return the impulse signal as the response signal even when receiving the impulse signal.

Figure 8:
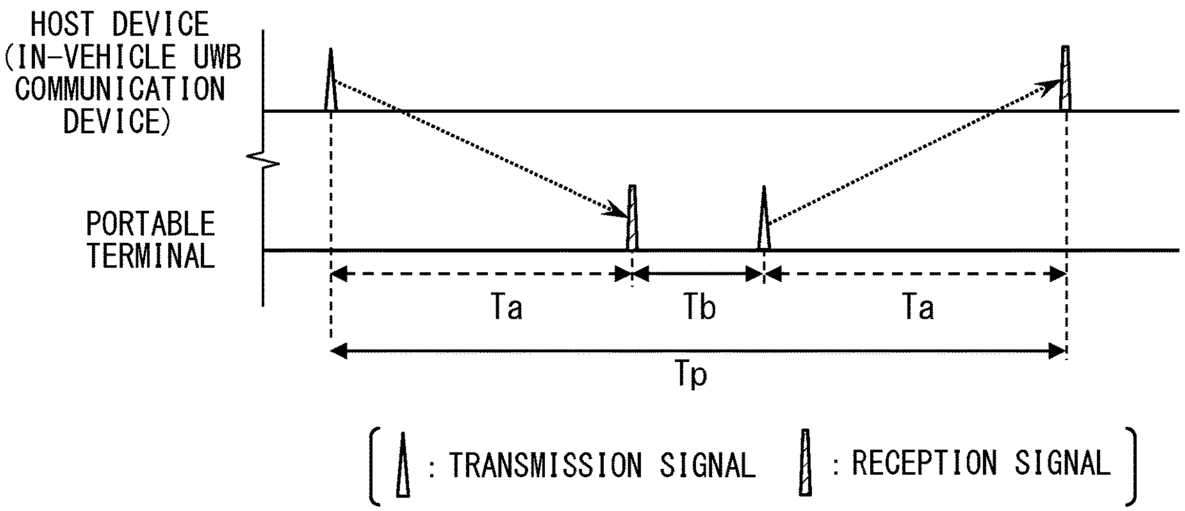
FIG. 8 is a diagram showing a relationship between the propagation time and a round trip time.

In S103 to S104 described above, the propagation time measurement portion 33 of the host device measures a round trip time Tp based on the instruction from the position estimation portion F5, as shown in FIG. 8. Then, the assumed value of the response processing time Tb in the portable terminal 2 is subtracted from the round trip time Tp. The assumed value of the response processing time Tb may be registered, as a parameter for calculation, in the flash memory 112. The value obtained by subtracting the response processing time Tb from the round trip time Tp corresponds to a flight time for the both-way. Therefore, a value obtained by dividing, by 2, the value obtained by subtracting the response processing time Tb from the round trip time Tp corresponds to a flight time for the one-way of the wireless signal. The propagation time measurement portion 33 provides, as the propagation time Ta, the value obtained by dividing, by 2, the value obtained by subtracting the response processing time Tb from the round trip time Tp, to the smart ECU 11.

The propagation time measurement portion 33 may provide data indicating that the propagation time Ta is unknown to the smart ECU 11, when the impulse signal as the response signal has not been received in a case where a predetermined response waiting time has elapsed after the impulse signal is transmitted. The response waiting time may be set to, for example, a value such as 33 nanoseconds on assumption of a state where the user is sufficiently away from the vehicle Hv (for example, 10 meters). Hereinafter, the UWB communication device 12, that has received the impulse signal as the response signal from the portable terminal 2 and, as the result, succeeded the measurement of the propagation time Ta, is also referred to as a measurement successful device. The propagation time Ta functions as information indicating the distance to the portable terminal 2.

In S105, it is determined whether all normal devices are caused to measure the propagation time Ta. When all normal devices are caused to measure the propagation time Ta, the determination in S105 is positive and S107 is executed. On the other hand, when there is the normal device that has not yet measured the propagation time Ta, the determination in S105 is negative, and S106 is executed.

In S106, an arbitrary normal device that has not yet measured the propagation time Ta is set to the host device, and S103 is executed. The order of operating as the host device (in other words, the order in which the impulse signal is transmitted) may be appropriately designed. For example, when all UWB communication device 12 are the normal devices, the position estimation portion F5 sets the right communication device 12A, the left communication device 12B, the front communication device 12C, the rear communication device 12D, and the rear end communication device 12E to the host device in this order. The propagation time Ta measured by each UWB communication device 12 indirectly indicates the distance from each UWB communication device 12 to the portable terminal 2. That is, the propagation time Ta corresponds to distance information. Therefore, a series of processes from S103 to S106 corresponds to a process of collecting the distance information from each UWB communication device 12 to the portable terminal 2 by causing each UWB communication device 12 to transmit the impulse signal.

In S107, the estimation procedure switch portion F53 determines, as the results of processes of S103 to S106, whether three or more UWB communication devices 12 have acquired the propagation times. That is, it is determined whether the number of measurement successful devices is three or more. When the three or more UWB communication devices 12 have acquired the propagation times, it means that the three or more UWB communication devices 12 are in a positional relationship (in other words, state) capable of wirelessly communicating with the portable terminal 2. A case where a certain UWB communication device 12 has not acquired the propagation time includes a case where the communication with the portable terminal 2 accidentally fails, a case where the UWB communication device 12 malfunctions, and the like. Further, the UWB communication device 12 that has acquired the propagation time corresponds to, for example, an UWB communication device 12 that has received the impulse signal as response from the portable terminal 2.

When the three or more UWB communication devices 12 have acquired the propagation times, the determination in S107 is positive and S108 is executed. On the other hand, when the number of UWB communication devices 12 that have acquired the propagation time is less than three, the determination in S107 is negative and S109 is executed. The determination process in S107 corresponds to a step of determining whether the coordinate calculation condition is satisfied. A case where the three or more UWB communication devices 12 have acquired the propagation times corresponds to a state where the coordinate calculation condition is satisfied. A case where the number of UWB communication devices 12 that have acquired the propagation times are less than three corresponds to a state where the coordinate calculation condition is not satisfied.

In S108, the position coordinate calculation portion F51 calculates, as the three-dimensional position estimation process, the position of the portable terminal 2 based on the installation position of each UWB communication device 12 that has acquired the propagation time and the distance information from each UWB communication device 12 to the portable terminal 2. Communication device position data stored in the flash memory 112 may be used for the installation position of each UWB communication device 12. The distance from each UWB communication device 12 to the portable terminal 2 may be set to a value obtained by multiplying the propagation time Ta of each UWB communication device 12 by the speed of light. The position estimation based on the installation position of each UWB communication device 12 and the distance information from each UWB communication device 12 to the portable terminal 2 can be performed by using the principle of triangulation. As the position estimation method using the installation position of each UWB communication device 12 and the distance information to the portable terminal 2, various algorithms such as the least squares method, the Newton-Raphson method, or the MMSE (Minimum Mean Square Estimate) method can be adopted.

The position coordinate, which is calculated in S108, of the portable terminal 2 is referred by the vehicle controller F6 or the like. For example, when the position coordinate calculated in S108 is located in the right area Ra, the vehicle controller F6 unlocks or locks the door on the right side of the vehicle based on the determination result. Further, when the position coordinate calculated in S108 is located inside the vehicle such as in the front seat area Rc or the rear seat area Rd, the vehicle controller F6 starts the engine in cooperation with the engine ECU 17 or sets the engine to a start standby state. The start standby mode is a state where the engine is started when the user performs a predetermined operation including pressing the start button 15.

In S109, as the area inside-outside determination process, the presence area determination portion F52 determines the presence area of the portable terminal 2 (for example, which system actuation area the portable terminal 2 is present in) based on the communication status of each UWB communication device 12 with the portable terminal 2. For example, when the right communication device 12A has succeeded in measuring the propagation time Ta, the presence area determination portion F52 calculates the distance from the right communication device 12A to the portable terminal 2 by multiplying the propagation time by the speed of light. Then, when the calculated distance is equal to or less than the vehicle exterior actuation distance, it is determined that the portable terminal 2 is present in the right area Ra. When the distance from the right communication device 12A to the portable terminal 2 exceeded the vehicle exterior actuation distance or when the right communication device 12A failed to measure the propagation time Ta, it may be determined that no portable terminal 2 is present in the right area Ra. For the other UWB communication devices 12, the similar determination is performed based on the communication status with the portable terminal 2, and thereby the location of the portable terminal 2 is determined. Here, the communication status includes whether the propagation time has been measured or the length of the propagation time.

When it is determined that the portable terminal 2 is not present in any of the system actuation areas such as the right area Ra, the left area Rb, the rear area Re, the front seat area Rc, and the rear seat area Rd, the portable terminal 2 may be determined to be present in the prohibited area.

The determination result in S109 is referred by the vehicle controller F6 or the like. For example, when, in S109, the portable terminal 2 is determined to be present in the right area Ra, the vehicle controller F6 unlocks or locks the door on the right side of the vehicle based on the determination result. Further, when, in S109, the portable terminal 2 is determined to be present inside the vehicle such as in the front seat area Rc or the rear seat area Rd, the vehicle controller F6 starts the engine in cooperation with the engine ECU 17 or sets the engine to a start standby state.

Effects of Embodiment

Here, the effects of the present embodiment will be described by introducing a comparison configuration. A comparative configuration is a configuration that does not include the area determination mode and only includes the three-dimensional position estimation mode. In such a comparative configuration, when the number of UWB communication devices 12 that can communicate with the portable terminal 2 is less than three, the position of the portable terminal 2 becomes unknown (unspecified). When the position of the portable terminal 2 becomes unknown, it cannot be identified whether the portable terminal 2 is present in the actuation area, and the door of the vehicle Hv is not unlocked. That is, the user cannot use the function as the PEPS system, and the convenience is reduced.

On the other hand, when the number of UWB communication devices 12 that can wirelessly communicate with the portable terminal 2 (in other words, can measure the distance to the portable terminal 2) is less than three, the smart ECU 11 of the present embodiment operates in the area determination mode. That is, the distance information observed by the measurement successful device is individually used, and it is determined whether the portable terminal 2 is present in the system actuation area defined based on the installation position of the measurement successful device.

According to such a configuration, when only one or two UWB communication devices 12 have succeeded in measuring the propagation time to the portable terminal 2 due to the malfunction of the UWB communication device 12, a communication error, or the like, it is possible to recognize whether the portable terminal 2 is present in the system actuation area. For example, the propagation time observed by the right communication device 12A is a value indicating that the portable terminal 2 is present within the vehicle exterior actuation distance from the right communication device 12A, the smart ECU 11 can confirm that the user is present in the right area Ra. Therefore, the user can perform the vehicle control for using the vehicle Hv such as unlocking the right door.

That is, according to the above-described configuration, even when the number of in-vehicle communication devices that can normally operate is less than three, it is possible to estimate the position of the portable terminal 2. Further, along with this, it is possible to reduce a possibility that the user cannot board the vehicle Hv even though the user is present in the vicinity of the door of the vehicle Hv. In addition, it is possible to reduce a possibility that the user cannot start the engine even though the user is present inside the vehicle. That is, it is possible to reduce a possibility that the user cannot use the vehicle Hv even though the user is present inside the vehicle or around the vehicle. As the result, it is possible to prevent the convenience for the user from decreasing.

Further, the smart ECU 11 of the present embodiment estimates the position of the portable terminal 2 in more detail when the number of UWB communication devices 12 that have succeeded in measuring the propagation time between the portable terminal 2 and the UWB communication device 12 are three or more. That is, the position coordinate of the portable terminal 2 is specified. According to such a configuration, it is possible to execute finer services or applications in accordance with the position of the portable terminal 2 (nearly equal to the user). The finer services or applications in accordance with the user are, for example, a welcome lighting function, a remote parking application, a vehicle calling application, and the like. The welcome lighting function is a function that controls a lighting state of a lighting device for the vehicle interior or the vehicle exterior in accordance with the user position. For example, it refers to a function of changing the lighting device to be turned on or changing a lighting color so as to follow the user position. The remote parking application is an application causing the vehicle Hv to be parked by the remote operation and activates on condition that the user is present within the predetermined range from the vehicle Hv. The vehicle calling application is an application that operates in the opposite manner to the remote parking application, and is an application that causes the vehicle to automatically travel to the user.

As described above, by having both of the three-dimensional position estimation mode and the area determination mode, the smart ECU 11 of the present disclosure can provide the services or applications using more detailed user position information and can reduce the possibility that the user cannot use the vehicle Hv. That is, according to the smart ECU 11 of the present disclosure, it is possible to execute the services or applications using the more detailed user position information while maintaining the convenience for the user.

In addition, in the present embodiment, each UWB communication device 12 is mounted in a place having a good visibility both inside and outside the vehicle such the ceiling portion or the upper region of the pillar. Generally, the electric waves (hereinafter, high frequency electric waves) of 1 GHz or more such as the impulse signal used in the UWB communication are easily reflected by the metal. Further, the high frequency electric waves are easily absorbed by the human body. Therefore, when a body (hereinafter, shield) that reflects or absorbs the electric waves such as a metal body or a human body is present in an advancing direction of the high frequency electric waves, the electric waves propagates so as to go around the shield (that is, be diffracted) or is reflected by the shield.

When the portable terminal 2 and the UWB communication device 12 communicate with each other by diffraction or reflection (that is, indirectly), an error may occur in the estimated distance from the UWB communication device 12 to the portable terminal 2. In particular, due to the situation where the portable terminal 2 is located so as not to get an unobstructed view of the UWB communication device 12, when the UWB communication device 12 and the portable terminal 2 communicate by reflection of a structure such as another vehicle, more errors may be included.

In response to such a situation, in the present embodiment, each UWB communication device 12 is mounted in a place having a good visibility both inside and outside the vehicle. According to such a mounting aspect, it is possible to reduce a possibility that the communication aspect with the portable terminal 2 becomes an indirect communication. In other words, it is possible to reduce a possibility that the distance from each UWB communication device 12 to the portable terminal 2 includes the error due to the diffraction or the reflection of the wireless signal. As the result, it is possible to estimate the position of the portable terminal 2 more accurately.

The embodiment of the present disclosure has been described above. The present disclosure should not be limited to the above embodiment, but has a technical scope including various modifications to be described hereinafter and can also be implemented with various changes not described below within a scope not departing from the purpose of the present disclosure. For example, various modifications to be described below can be implemented in appropriate combination within a scope that does not cause technical inconsistency. Note that members having the same functions as those described in the above embodiment are denoted by the same reference numerals, and a description of the same members will be omitted. When only a part of the configuration is described, the configuration described in the preceding embodiment can be applied to other parts.

[First Modification]

In the above-described embodiment, when the number of measurement successful devices are less than three, the smart ECU 11 operates in the area determination mode. However, the condition for causing the smart ECU 11 to operate in the area determination mode is not limited to this. For example, when the number of normal devices are less than three, the smart ECU 11 may operate in the area determination mode. The number of UWB communication devices 12 that are normally operating may be determined by the communication device diagnosis portion F4. The above-described configuration corresponds to a configuration that switches the position estimation procedure to a procedure using the position coordinate calculation portion F51 or a procedure using the presence area determination portion F52 in accordance with the number of UWB communication devices 12 determined to be normally operating by the communication device diagnosis portion F4. Further, the above-described configuration corresponds to a configuration that determines that the coordinate calculation condition is not satisfied when the number of normal devices are less than three, and drives the presence area determination portion F52.

[Second Modification]

Figure 9:
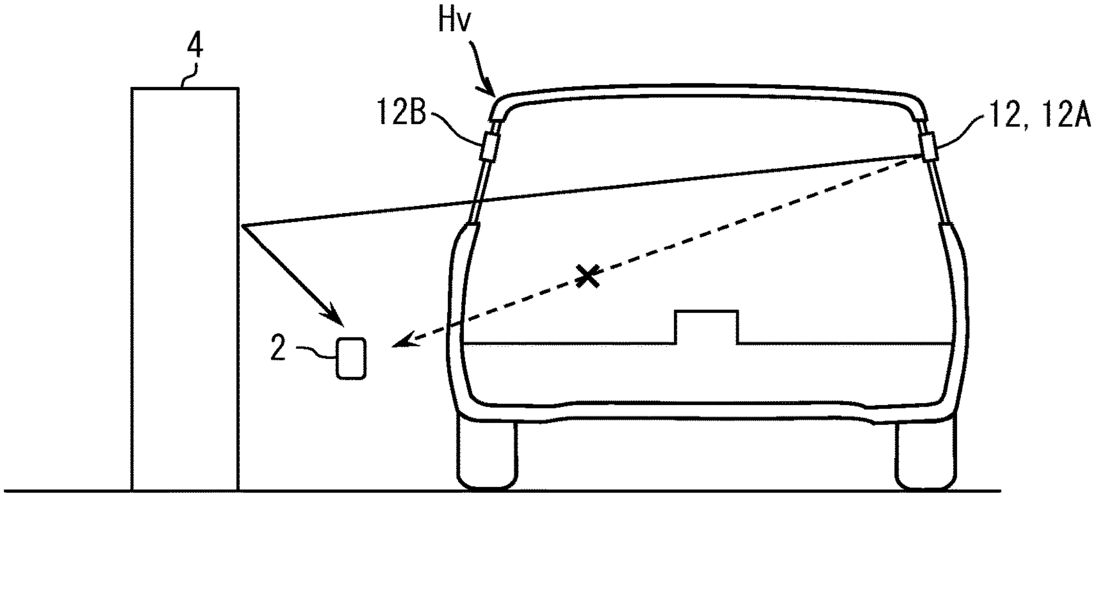
FIG. 9 is a diagram for illustrating a state where a vehicle is in a multipath environment.

In a multipath environment, an error is likely to be included in the estimation distance from the UWB communication device 12 to the portable terminal 2. For example, as shown in FIG. 9, when the portable terminal 2 cannot directly receive the signal from the UWB communication device 12 (for example, right communication device 12A) and is located so as to receive the signal reflected by a reflective body 4 such as an adjacent vehicle or a wall, a delay of several nanoseconds occurs as the propagation time. As the result, the error occurs in the estimation distance from the UWB communication device 12 to the portable terminal 2, and the estimation accuracy of the position of the portable terminal 2 deteriorates. In such a situation shown in FIG. 9, since the left communication device 12B can directly communicate with the portable terminal 2, the measurement accuracy by the left communication device 12B is maintained at a relatively high level.

Therefore, it is preferable that the position estimation portion F5 verifies the calculation result of the position coordinate calculation portion F51 by using the determination result of the presence area determination portion F52 when the periphery of the vehicle Hv is in the multipath environment. Hereinafter, one example of the configuration of the smart ECU 11 is referred to as a second modification. Here, the multipath environment is an environment in which the reflective body such as a different vehicle, a wall, or a pillar is present within a predetermined distance (for example, 1 meter) from the vehicle Hv.

Figure 10:
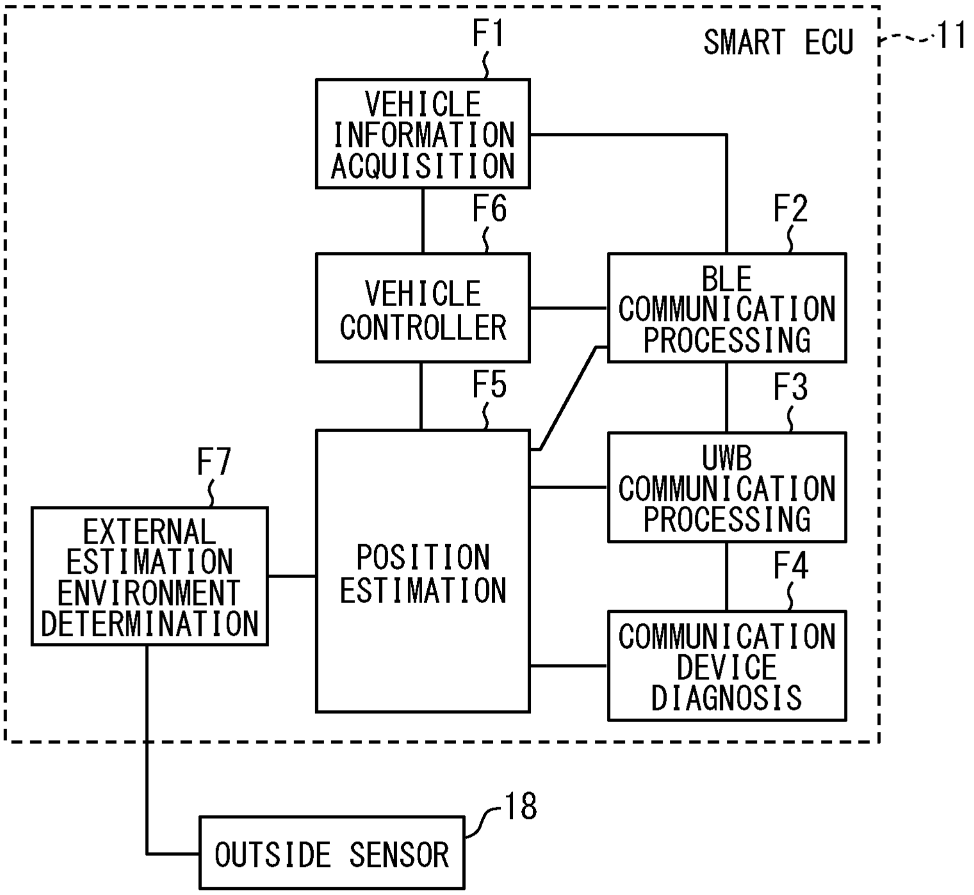
FIG. 10 is a block diagram showing a configuration of a smart ECU according to a second modification.

As shown in FIG. 10, the smart ECU 11 of the present modification includes an external environment determination portion F7 that determines whether the periphery of the subject vehicle is the multipath environment based on a signal input from an outside sensor 18. Here, the outside sensor 18 is a sensor that outputs information indicating the position of the body in periphery of the vehicle Hv and the type of the body. For example, the outside sensor 18 is a camera (hereinafter, peripheral monitoring camera) that captures the outside of the vehicle. The external environment determination portion F7 analyzes the captured image of the peripheral monitoring camera as the outside sensor 18, and determines whether the reflective body 4 such as the different vehicle, the wall, or the pillar is present within 1 meter from the vehicle Hv. Then, when the reflective body 4 is present within 1 meter from the vehicle Hv, the peripheral environment of the vehicle Hv is determined to be the multipath environment.

The external environment determination portion F7 may activate the peripheral monitoring camera as the outside sensor 18 and acquire the outside image, for example, when the approach of the user to the vehicle Hv is detected. The approach of the user to the vehicle Hv may be detected based on, for example, the reception of the advertisement signal by the BLE communication device 13 from the portable terminal 2. According to the control aspect, it is not necessary to always activate the outside camera while the vehicle is parked, so that it is possible to prevent the dark current while the vehicle is parked. Whether the periphery of the vehicle is the multipath environment may be determined at a timing when the approach of the user is detected (in other words, at the time when the communication connection with the portable terminal 2 is established). The external environment determination portion F7 may determine when the periphery of the vehicle is the multipath environment at the time when the vehicle Hv is parked.

Figure 11:
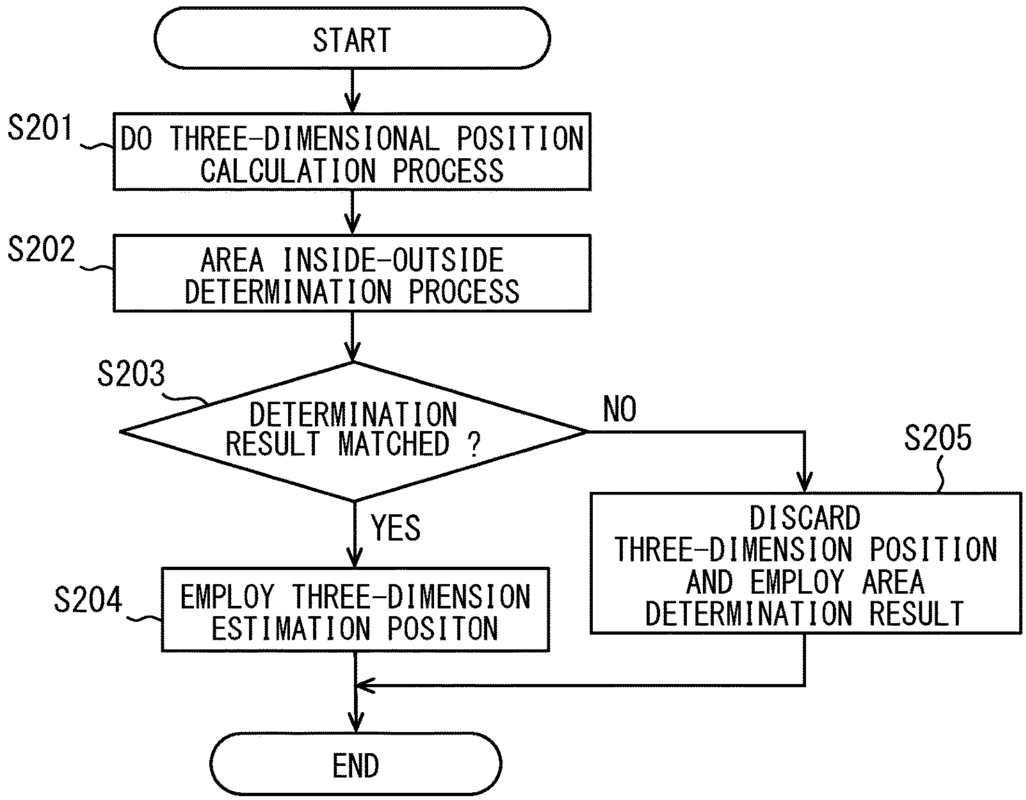
FIG. 11 is a flowchart for illustrating operations of the smart ECU according to the second modification.

The position estimation portion F5 of the present modification estimates the position of the portable terminal 2 in accordance with a flow shown in FIG. 11, for example, when the external environment determination portion F7 determines that the vehicle Hv is in the multipath environment. The flowchart shown in FIG. 11 is an alternative process of S108. For example, when the external environment determination portion F7 determines that the vehicle Hv is in the multipath environment and also the number of measurement successful devices is three or more, the position estimation portion F5 of the present modification executes a three-dimensional position calculation process as S201. That is, the position of the portable terminal 2 is calculated based on the installation position of each UWB communication device 12 that has acquired the propagation time and the distance information from each UWB communication device 12 to the portable terminal 2. When the calculation process in S201 is completed, the area inside-outside determination process is executed as S202. The execution order of S201 and S202 may be interchanged. Further, the processes of S201 and S202 may be executed in parallel (substantially at the same time). When the process in S202 is completed, S203 is executed.

In S203, it is determined whether the position coordinate (hereinafter, three-dimensional estimation position) calculated by the position coordinate calculation portion F51 in S201 matches the presence area of the portable terminal 2 determined by the presence area determination portion F52 in S202. A case where the three-dimensional estimation position calculated by the position coordinate calculation portion F51 matches with the presence area of the portable terminal 2 determined by the presence area determination portion F52 is a case where the three-dimensional estimation position is included in the presence area of the portable terminal 2 determined by the presence area determination portion F52. Further, a case where the three-dimensional estimation position calculated by the position coordinate calculation portion F51 does not match the presence area of the portable terminal 2 determined by the presence area determination portion F52 is a case where the three-dimensional estimation position is located outside the presence area of the portable terminal 2 determined by the presence area determination portion F52. For example, in a case where the presence area determination portion F52 determines that the portable terminal 2 is present in the left area Rb, when the position coordinate calculated by the position coordinate calculation portion F51 is located in the prohibited area, it is determined that the three-dimensional estimation position does not match the presence area.

When the three-dimensional estimation position calculated by the position coordinate calculation portion F51 matches the presence area of the portable terminal 2 determined by the presence area determination portion F52 (YES in S203), the three-dimensional estimation position is used as the position of the portable terminal 2 (S204). On the other hand, when the three-dimensional estimation position calculated by the position coordinate calculation portion F51 does not match the presence area of the portable terminal 2 determined by the presence area determination portion F52 (NO in S203), the three-dimensional estimation position is not used and is discarded. Then, the determination result of the presence area determination portion F52 is provided as the terminal position information to the vehicle controller F6 or the like.

Such a configuration corresponds to a configuration that verifies the calculation result of the position coordinate calculation portion F51 by using the determination result of the presence area determination portion F52. According to such a configuration, it is possible to reduce the possibility that the vehicle is controlled with use of the erroneous position information since the calculation result of the position coordinate calculation portion F51 is used for the vehicle control after the determination result of the presence area determination portion F52 is verified. Further, it is possible to reduce the possibility of erroneously estimating the position of the portable terminal 2 due to the influence of the reflection or the like. That is, it is possible to enhance the robustness to the external environment.

The determination method of determining whether the periphery of the subject vehicle is the multipath environment can be appropriately changed. For example, the external environment determination portion F7 may determine whether the periphery is in the multipath environment based on the reception situation of the signal from the portable terminal 2. For example, when the SN ratio of the BLE signal from the portable terminal 2 is less than a predetermined threshold, it may be determined that the periphery of the subject vehicle is in the multipath environment. Further, the environment in peripheral of the subject vehicle may be determined based on the high accuracy map data and the absolute position information of the subject vehicle.

Further, in the above, the periphery monitoring camera is adopted as the outside sensor 18. However, a device that can be adopted as the outside sensor 18 is not limited to this. The outside sensor 18 may be implemented by, for example, a laser radar, a millimeter wave radar, an ultrasonic sensor, and a combination thereof. The outside sensor 18 may output data indicating the location of the reflective body 4 that is present in the periphery of the vehicle. When the laser radar, the millimeter radar, the ultrasonic sensor, or the like is used as the outside sensor 18, whether the detected body corresponds to the human may be identified by using a predetermined feature amount.

[Third Modification]

In the above-described second modification, when the external environment determination portion F7 determines that the vehicle Hv is in the multipath environment, both of the three-dimensional position calculation process and the area inside-outside determination process are executed. However, the operation aspect of the smart ECU 11 in consideration of the external environment is not limited to this. The smart ECU 11 may operate in the area determination mode on condition that the vehicle Hv is determined to be in the multipath environment by the external environment determination portion F7. According to such a configuration, it is possible to reduce the calculation load of the smart ECU 11.

The above-described configuration corresponds to a configuration that switches the position estimation procedure to the procedure using the position coordinate calculation portion F51 or the procedure using the presence area determination portion F52 depending on whether the vehicle Hv is in the multipath environment. Further, the above-described configuration corresponds to a configuration that determines that the coordinate calculation condition is not satisfied when the number of measurement successful devices is three or more in the case were the vehicle Hv is in the multipath environment. Furthermore, the configuration drives the presence area determination portion F52.

The condition (that is, coordinate calculation condition) for the smart ECU 11 to operate in the three-dimensional position estimation mode can be appropriately combined and implemented. The smart ECU 11 may operate in the three-dimensional position estimation mode in consideration of multiple types of items such as an operation situation of each UWB communication device 12, a communication status between each UWB communication device 12 and the portable terminal 2, and a peripheral environment of the vehicle Hv. The operation situation of each UWB communication device 12 is, for example, the number of normal devices. The communication status between each UWB communication device 12 and the portable terminal 2 is, for example, the number of measurement successful devices. The peripheral environment of the vehicle Hv indicates whether the vehicle Hv is in the multipath environment. The specific content of the coordinate calculation condition may be defined as that the number of measurement successful devices is four or more, or may be defined as that the number of measurement successful devices is three or more and also the periphery is not in the multipath environment. In other words, the smart ECU 11 may determine that the coordinate calculation condition is not satisfied and operate in the area determination mode even when the number of measurement successful devices is less than four or when the periphery is in the multipath environment. The fact that the number of measurement successful devices is three or more is a minimum necessary condition for the smart ECU 11 to operate in the three-dimensional position estimation mode, and is not necessarily a successful condition. The smart ECU 11 may operate in the area determination mode when it is determined that a desired positioning accuracy is not obtained based on the communication status between each UWB communication device 12 and the portable terminal 2 or the like. The condition for the smart ECU 11 to operate in the area determination mode (in other words, the condition for determining that the coordinate calculation condition is not satisfied) may be appropriately designed.

[Fourth Modification]

In the above-described embodiment, the smart ECU 11 determines whether the portable terminal 2 is present in the system actuation area in accordance with each UWB communication device 12 based on the propagation time. However, the method for determining whether the portable terminal 2 is present in the system actuation area in accordance with each UWB communication device 12.

When each UWB communication device 12 is configured so that the transmission output is narrowed (in other words, can be adjusted), whether the portable terminal 2 is present in the system actuation area in accordance with each UWB communication device 12 may be determined by the following method. That is, in the three-dimensional position estimation mode, the smart ECU 11 causes each UWB communication device 12 to transmit the impulse signal with a predetermined default electric power. The default level is, for example, a level that provides a communication distance of 5 meters or more. On the other hand, in the area determination mode, the smart ECU 11 causes each UWB communication device 12 to transmit the impulse signal at a predetermined area formation level. The area formation level is a level which is smaller than the default level and at which the portable terminal 2 may return the impulse signal as the response signal only when the portable terminal 2 is present in the system actuation area that should be formed by the UWB communication device 12. Then, in the area determination mode, the smart ECU 11 may cause each UWB communication device 12 to transmit the impulse signal sequentially, and may determine that the portable terminal 2 is present in the system actuation area in accordance with the UWB communication device 12 that has received the response signal from the portable terminal 2. The presence area of the portable terminal 2 can be specified by the above-described configuration.

[Fifth Modification]

The installation aspect (specifically, installation position or the number of installations) of the UWB communication devices 12 is not limited to the above-described aspect. For example, the right communication device 12A or the left communication device 12B may be placed at an A-pillar, at a C-pillar, in the vicinity of front wheels, or at a side mirror. The right communication device 12A or the left communication device 12B may be attached to a side surface portion (particularly, the vicinity of the door) of the vehicle Hv. The front communication device 12C may be provided at a central portion in a vehicle width direction of an instrument panel, a front portion of the driver seat, a center console, or the like. The rear communication device 12D may be buried in a central portion of the rear seat in the vehicle direction. The vicinity of a certain member is a region within, for example, 30 centimeters from the member. The rear end communication device 12E may be attached to a vicinity of a rear bumper or a license plate or an upper end of a rear glass.

In addition, as the attachment positions of the UWB communication devices 12, the instrument panel, a center console, an overhead console, a vicinity of a rearview mirror, an upper end of a rear glass, and the like can be adopted. The UWB communication device 12 may be placed in the vicinity (hereinafter, a side surface upper end portion) of a boundary between a side surface portion of the vehicle Hv and a roof portion. Such a configuration corresponds to a configuration in which the UWB communication device 12 is placed at a frame portion located above a side window.

Further, when the body of the vehicle Hv is implemented by using a material though which the electric waves pass, as the attachment position of the right UWB communication devices 12A, an outer door handle placed at a right surface portion, in the vicinity of an inner door handle placed at the right surface portion, a side sill on the right side of the vehicle, and the like can be adopted. The left communication device 12B may be attached at a position symmetrical to the right communication device 12A on the left surface position. The material through which the electric waves pass is, for example, the resin.

Further, the number of UWB communication devices 12 connected to the smart ECU 11 may be three, five, six, or more. For example, the UWB communication devices 12 connected to the smart ECU 11 may be only three communication devices 12 of the right communication device 12A, the left communication device 12B, and the rear communication device 12D. Further, the in-vehicle system 1 may include the UWB communication device 12 attached in the trunk. The smart ECU 11 may be connected to at least three UWB communication devices 12.

[Sixth Modification]

In the above-described embodiment, the propagation time for one way is used as distance information from the UWB communication device 12 to the portable terminal 2. However, as the distance information, the round trip time Tp may be used. Further, the distance information may be data directly indicating the distance to the portable terminal 2 by multiplying the propagation time by the speed of light. In the above-described embodiment, the propagation time is calculated from the round trip time Tp. However, it is not limited to this. For example, in a case where each UWB communication device 12 and the portable terminal 2 are completely synchronized, each UWB communication device 12 may calculate the propagation time based on the difference between a time point when the portable terminal 2 planned to transmit the impulse signal and a time point when the impulse signal was received from the portable terminal 2. The time point when the portable terminal 2 planned to transmit the impulse signal can be calculated by, for example, prescribing a timing at which the portable terminal 2 transmits the impulse signal.

Further, in the above, the distance from the in-vehicle communication device to the portable terminal 2 is estimated using the propagation time of the wireless signal. However, it is not limited. The distance from the in-vehicle communication device to the portable terminal 2 may be specified based on the reception intensity of the wireless signal. For example, each in-vehicle communication device may estimate the distance based on the reception intensity of the signal transmitted from the portable terminal 2. The reception intensity also corresponds to the distance information.

[Seventh Modification]

Figure 12:
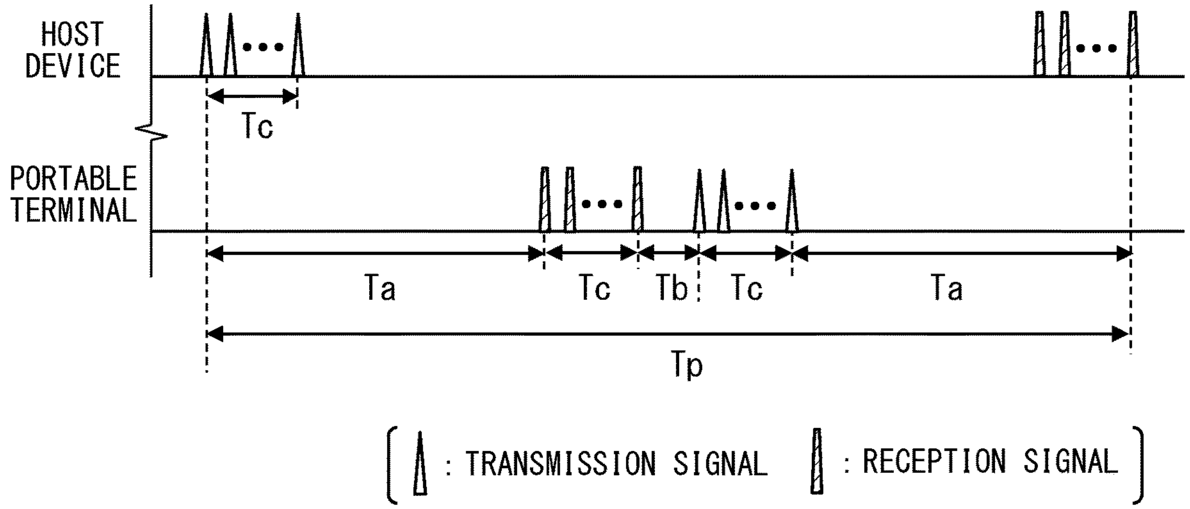
FIG. 12 is a diagram for illustrating operations of a vehicular electronic key system according to a seventh modification.

The signal transmitted and received for estimating the propagation time (and thus distance) may not be the single impulse signal but a pulse sequence signal having a constant length as shown in FIG. 12. The pulse sequence signal preferably includes transmission source information and destination information. When the pulse sequence signal includes the transmission source information and the destination information, without limiting the operation of the UWB communication device 12 other than the host device, it is possible to prevent the UWB communication device 12 other than the host device from transmitting the response signal. In the present modification, the propagation time Ta may be calculated from the round trip time Tp by using an assumed value of a length (hereinafter, signal length) Tc of the pulse sequence signal. That is, the propagation time Ta may be calculated as $Ta=(Tp-Tb-Tc\times 2)/2$.

[Eighth Modification]

In the above-described embodiment, each UWB communication device 12 is set as the area formation station. However, it is not limited to this. Among the multiple UWB communication devices 12, only the right communication device 12A, the left communication device 12B, and the rear end communication device 12E may be set as the area formation station. Further, when the driver seat is placed on the left, only the left communication device 12B and the front communication device 12C may be set as the area formation station. Only one UWB communication device 12 may be set as the area formation station.

[Ninth Modification]

In the above-described embodiment, the distance from the UWB communication device 12 as the reference station to the portable terminal 2 is estimated using the impulse signal of the UWB communication. However, it is not limited to this. For example, the in-vehicle communication device that estimates the distance to the portable terminal 2 may be a communication device that performs a wireless communication that complies with a short distance wireless communication standard such as Bluetooth, Wi-Fi, or ZigBee. That is, the in-vehicle communication device as the reference station mounted on the vehicle Hv may acquire the distance information to the portable terminal 2 by using a wireless signal compliant with a short distance wireless communication standard such as Bluetooth, Wi-Fi, or ZigBee. It is preferable that the in-vehicle communication device and the portable terminal 2 measure the distance by using a wireless signal of 1 GHz or more.

[Tenth Modification]

When the smart ECU 11 operates in the area determination mode, the portable terminal 2 may be notified by the BLE communication, and the display of the portable terminal 2 may show that the smart ECU 11 is operating in the area determination mode. According to such a configuration, it is possible to reduce the possibility that the user is confused by operation of the smart ECU 11 in the area determination mode. The notification of the operation mode of the smart ECU 11 may be implemented by voice, vibration, or blinking of an indicator.

The controller and the method thereof described in the present disclosure are implemented by a dedicated computer provided by configuring a processor and a memory programmed to execute one or more functions embodied by a computer program. Alternatively, the controller and the method described in the present disclosure may be implemented by a dedicated computer provided by configuring a processor with one or more dedicated hardware logic circuits. Alternatively, the controller and the method thereof described in the present disclosure are based on a combination of a processor and a memory programmed to execute one or more functions and a processor configured by one or more hardware logic circuits. It may be implemented by one or more configured dedicated computers. The computer program may also be stored in a computer-readable non-transitory tangible recording medium as instructions to be executed by a computer.

Here, the controller is, for example, the smart ECU 11. Further, the portable terminal controller 23 may be also included in the above-described controller. The methods or functions provided by the smart ECU 11 may be provided by software stored in a tangible memory device and a computer executing the software, only software, only hardware, or a combination of the software and the hardware. Some or all of the functions of the smart ECU 11 may be configured as hardware. A configuration in which a certain function is implemented as hardware includes a configuration in which the function is implemented by using one or more ICs or the like. In the above-described embodiment, the smart ECU 11 is implemented by using the CPU. However, the configuration of the smart ECU 11 is not limited to this. The smart ECU 11 may be implemented by using a MPU (Micro Processor Unit), a GPU (Graphics Processing Unit), or a DFP (Data Flow Processor), instead of the CPU 111. Further, the smart ECU 11 may be implemented by a combination of various processors such as the CPU 111, the MPU, the GPU, and the DFP. Further, for example, some of the functions to be provided by the smart ECU 11 may be implemented by using a FPGA (Field-Programmable Gate Array), an ASIC (Application Specific Integrated Circuit), or the like. The similar applies to the portable terminal controller 23.

Here, it is noted that a flowchart or the process of the flowchart in the present disclosure includes multiple steps (also referred to as sections), each of which is represented, for instance, as S101. Further, each step can be divided into several sub-steps while several steps can be combined into a single step.

In the above, the embodiment, the configuration, and the aspect of the vehicular position estimation system according to the present disclosure are exemplified. However, the present disclosure is not limited to every embodiment, every configuration and every aspect related to the present disclosure that are exemplified. For example, embodiments, configurations, and examples obtained from an appropriate combination of technical elements disclosed in different embodiments, configurations, and examples are also included within the scope of the embodiments, configurations, and examples of the present disclosure.

The invention claimed is:

1. A vehicular position estimation system configured to estimate a portable terminal position with respect to a vehicle by causing a plurality of in-vehicle communication devices placed at predetermined positions on the vehicle to wirelessly communicate with a portable terminal carried by a user of the vehicle, each of three or more in-vehicle communication devices, of the plurality of in-vehicle communication devices, being installed on a different position on the vehicle, each of the plurality of in-vehicle communication devices generating distance information directly or indirectly indicating a distance from each of the plurality of in-vehicle communication devices to the portable terminal by receiving a signal from the portable terminal, the vehicular position estimation system comprising:

a position coordinate calculation portion configured to calculate a position coordinate of the portable terminal by combining the distance information generated by the three or more in-vehicle communication devices and an installation position of each of the plurality of in-vehicle communication devices that has generated the distance information;

an area inside-outside determination portion configured to determine whether the portable terminal is present in a system actuation area that is a region within a predetermined system actuation distance from an area formation station, based on a communication status between the portable terminal and the area formation station that is a predetermined in-vehicle communication device among the plurality of in-vehicle communication devices;

a communication device diagnosis portion configured to determine whether a failure has occurred in each of the plurality of in-vehicle communication devices and to determine a numerical number of the plurality of in-vehicle communication devices to be operating normally based on the determinations of whether the failure has occurred;

wherein:

when a predetermined coordinate calculation condition including a numerical number of in-vehicle communication devices configured to communicate with the portable terminal is satisfied, the position coordinate calculation portion calculates the position coordinate of the portable terminal;

when the coordinate calculation condition is not satisfied, the area inside-outside determination portion determines whether the portable terminal is present inside the system actuation area;

the position coordinate calculation portion is further configured to calculate the position coordinate of the portable terminal based on the distance information generated by the area formation station;

the area inside-outside determination portion is further configured to determine whether the portable terminal is present in the system actuation area based on the distance information generated by the area formation station without using the position coordinate of the portable terminal to determine whether the portable terminal is present in the system actuation area;

when a determination result of the area inside-outside determination portion matches a calculation result of the position coordinate calculation portion, the calculation result of the position coordinate calculation portion is used as a position of the portable terminal;

the vehicle further includes a vehicle controller configured to unlock a door of the vehicle, lock the door of the vehicle, or start an engine of the vehicle based on at least one of the position coordinate of the portable terminal or the determination of whether the portable terminal is present inside the system actuation area;

when the communication device diagnosis portion determines that the numerical number of in-vehicle communication devices determined by the communication device diagnosis portion to be normally operating has been changed to be less than three, the area inside-outside determination portion determines whether the portable terminal is present inside the system actuation area;

the vehicular position estimation system further comprises a position estimation portion configured to sequentially set, as a host device, each of the plurality of in-vehicle communication devices determined to be normally operating;

each in-vehicle communication device is configured to generate distance information indicating a distance between the host device and the portable terminal located outside the vehicle;

after the distance information is generated, the position estimation portion determines, for all of the plurality of in-vehicle communication devices determined to be normally operating, whether the distance information has been generated;

when determining that the distance information of at least one of the plurality of in-vehicle communication devices determined to be normally operating has not yet been generated, the position estimation portion changes the host device to an in-vehicle communication device determined to be normally operating and not yet having generated the distance information among the plurality of in-vehicle communication devices;

each in-vehicle communication device transmits and receives, with the portable terminal, a pulse sequence signal that is the signal having a predetermined length and includes transmission source information and destination information, and generates the distance information; and the pulse sequence signal is transmitted and received between the in-vehicle communication device and the portable terminal to prevent an in-vehicle communication device other than the host device among the plurality of in-vehicle communication devices from transmitting a response signal.

2. The vehicular position estimation system according to claim 1, wherein:

when a numerical number of in-vehicle communication devices that have received a signal from the portable terminal among the plurality of in-vehicle communication devices is less than three, the area inside-outside determination portion determines whether the portable terminal is present inside the system actuation area.

3. The vehicular position estimation system according to claim 1, further comprising:

an external environment determination portion configured to determine whether a peripheral environment of the vehicle is a multipath environment, wherein:

when the external environment determination portion determines that the peripheral environment is the multipath environment, the area inside-outside determination portion determines whether the portable terminal is present inside the system actuation area.

4. The vehicular position estimation system according to claim 3, wherein:

in the multipath environment, a reflective body such as a vehicle different from the vehicle, a wall, or a pillar is present within one meter from the vehicle.

5. The vehicular position estimation system according to claim 1, further comprising:

an external environment determination portion configured to determine whether a peripheral environment of the vehicle is a multipath environment, wherein:

when the external environment determination portion determines that the peripheral environment is the multipath environment, the position coordinate calculation portion calculates the position coordinate of the portable terminal and the area inside-outside determination portion determines whether the portable terminal is present inside the system actuation area based on the distance information generated by the area formation station.

6. The vehicular position estimation system according to claim 5, wherein:

when a calculated position coordinate is inside an area in which the portable terminal is determined to be present, the determination result of the area inside-outside determination portion matches the calculation result of the position coordinate calculation portion.

7. The vehicular position estimation system according to claim 1, wherein:

the plurality of in-vehicle communication devices includes:

a right communication device that is mounted on a right surface portion of the vehicle and is the area formation station that forms the system actuation area on a right side of the vehicle; and a left communication device that is mounted on a left surface portion of the vehicle and is the area formation station that forms the system actuation area on a left side of the vehicle;

when the right communication device has received the signal from the portable terminal, based on the distance information generated by the right communication device, the area inside-outside determination portion determines whether the portable terminal is present inside a right area that is the system actuation area formed on the right side of the vehicle; and when the left communication device has received the signal from the portable terminal, based on the distance information generated by the left communication device, the area inside-outside determination portion determines whether the portable terminal is present inside a left area that is the system actuation area formed on the left side of the vehicle.

8. The vehicular position estimation system according to claim 7, wherein:

the right communication device is attached to any of a door, a B-pillar, and a side sill that are placed on a right portion of the vehicle; and the left communication device is attached, on a right surface portion of the vehicle, at a position symmetrical to the right communication device.

9. The vehicular position estimation system according to claim 1, wherein:

the plurality of in-vehicle communication devices is configured to wirelessly communicate with the portable terminal by using an impulse signal of an ultra wide bandwidth.

10. The vehicular position estimation system according to claim 1, wherein:

when the position coordinate of the portable terminal is not used to determine whether the portable terminal is present in the system actuation area, a distance calculated based on a propagation time between the portable terminal and the vehicle is used by the area inside-outside determination portion to determine whether the portable terminal is present in the system actuation area.

11. The vehicular position estimation system according to claim 1, wherein the failure is a state where an amplifier is not operating inside at least one of the plurality of in-vehicle communication devices.

12. The vehicular position estimation system according to claim 1, wherein the vehicle position estimation system includes the plurality of in-vehicle communication devices.

13. A vehicular position estimation system for estimating a portable terminal position with respect to a vehicle by causing a plurality of in-vehicle communication devices placed at predetermined positions on the vehicle to wirelessly communicate with a portable terminal carried by a user of the vehicle, each of three or more in-vehicle communication devices being installed on a different position on the vehicle and including:

one or more first processors; and a first memory coupled to the one or more first processors and storing program instructions that when executed by the one or more first processors cause the one or more first processors to at least: generate distance information directly or indirectly indicating a distance from each of the plurality of in-vehicle communication devices to the portable terminal by receiving a signal from the portable terminal, the vehicular position estimation system comprising:

one or more second processors; and a second memory coupled to the one or more second processors and storing program instructions that when executed by the one or more second processors cause the one or more second processors to at least:

calculate a position coordinate of the portable terminal by combining the distance information generated by the three or more in-vehicle communication devices and an installation position of each of the plurality of in-vehicle communication devices that has generated the distance information;

determine whether the portable terminal is present in a system actuation area that is a region within a predetermined system actuation distance from an area formation station, based on a communication status between the portable terminal and the area formation station that is a predetermined in-vehicle communication device among the plurality of in-vehicle communication devices;

determine whether a failure has occurred in each of the plurality of in-vehicle communication devices and determine a numerical number of the plurality of in-vehicle communication devices to be operating normally based on the determination of whether the failure has occurred;

when a predetermined coordinate calculation condition including a numerical number of in-vehicle communication devices configured to communicate with the portable terminal is satisfied, calculate the position coordinate of the portable terminal;

when the coordinate calculation condition is not satisfied, determine whether the portable terminal is present inside the system actuation area;

calculate the position coordinate of the portable terminal based on the generated distance information;

determine whether the portable terminal is present in the system actuation area based on the distance information generated by the area formation station without using the position coordinate of the portable terminal to determine whether the portable terminal is present in the system actuation area;

when a determination result of whether the portable terminal is present in the system actuation area matches the calculated position coordinate of the portable terminal, the calculated position coordinate is used as a position of the portable terminal; and when the numerical number of in-vehicle communication devices determined to be normally operating changes to be less than three from three or more, determine whether the portable terminal is present inside the system actuation area;

wherein:

the vehicle includes a vehicle controller configured to unlock a door of the vehicle, lock the door of the vehicle, or start an engine of the vehicle based on at least one of the calculated position coordinate of the portable terminal or the determination of whether the portable terminal is present inside the system actuation area;

the program instructions, when executed by the one or more second processors further cause the one or more second processors to at least:

sequentially set, as a host device, each of the plurality of in-vehicle communication devices determined to be normally operating, each in-vehicle communication device being configured to generate distance information indicating a distance between the host device and the portable terminal located outside the vehicle;

determine, after the distance information is generated and for all of the plurality of in-vehicle communication devices determined to be normally operating, whether the distance information has been generated; and change, when determining that the distance information of at least one of the plurality of in-vehicle communication devices determined to be normally operating has not yet been generated, the host device to an in-vehicle communication device determined to be normally operating and not yet having generated the distance information among the plurality of in-vehicle communication devices;

each in-vehicle communication device transmits and receives, with the portable terminal, a pulse sequence signal that is the signal having a predetermined length and includes transmission source information and destination information, and generates the distance information; and the pulse sequence signal is transmitted and received between the in-vehicle communication device and the portable terminal to prevent an in-vehicle communication device other than the host device among the plurality of in-vehicle communication devices from transmitting a response signal.

* * * * *